United States Patent [19]
Tsunekawa et al.

[11] Patent Number: 5,815,338
[45] Date of Patent: Sep. 29, 1998

[54] APPARATUS AND METHOD OF DETECTING HEAD POSITION ERROR IN MAGNETIC DISK DRIVE

[75] Inventors: Masao Tsunekawa; Mutsumi Takemoto, both of Kawasaki; Harumi Seino, Higashine, all of Japan

[73] Assignee: Fujitsu Limited, Kawasaki, Japan

[21] Appl. No.: 419,840

[22] Filed: Apr. 11, 1995

Related U.S. Application Data

[63] Continuation of Ser. No. 956,069, Oct. 2, 1992, abandoned.

[30] Foreign Application Priority Data

Oct. 3, 1991 [JP] Japan ................................. 3-255632

[51] Int. Cl.$^6$ ...................................................... G11B 5/596
[52] U.S. Cl. ...................................... 360/77.04; 360/77.05
[58] Field of Search ............................. 360/77.02, 77.08, 360/78.14, 77.04, 77.05

[56] References Cited

U.S. PATENT DOCUMENTS

| | | | |
|---|---|---|---|
| 4,135,217 | 1/1979 | Jacques et al. | 360/77.04 |
| 4,499,511 | 2/1985 | Sugaya | 360/78.14 |
| 5,079,654 | 1/1992 | Uno et al. | 360/78.14 |
| 5,109,307 | 4/1992 | Sidman | 360/78.14 X |

FOREIGN PATENT DOCUMENTS

| | | |
|---|---|---|
| 0420439 | 4/1991 | European Pat. Off. . |
| WO8703130 | 5/1987 | WIPO . |

Primary Examiner—Aristotelis M. Psitos
Assistant Examiner—James L. Habermehl
Attorney, Agent, or Firm—Greer, Burns & Crain, Ltd.

[57] ABSTRACT

In a disk drive for detecting a position error distance of a head with respect to a measuring cylinder by reading servo data recorded on the measuring cylinder on a data surface of a disk, an apparatus and method of detecting a position error of a data head are provided which comprises repeatedly reading patterns written in advance relating to a plurality of kinds of servo data in at least three regions on the outer or inner peripheral side of the measuring cylinder or in both of them, and comparing the read results and detecting an accurate position error distance of the data head. More preferably, the apparatus and method include reading a plurality of kinds of patterns written in advance relating to servo data in at least three regions on the outer and inner peripheral sides of the measuring cylinder, detecting a rough position error distance of the data head from the measuring cylinder on the basis of part of the combinations of a plurality of kinds of patterns, and detecting a detailed position error distance of the data head on the basis of other part of combination of a plurality of kinds of patterns. Further preferably, the apparatus and method include alternately reading a plurality of kinds of patterns in two phases.

10 Claims, 34 Drawing Sheets

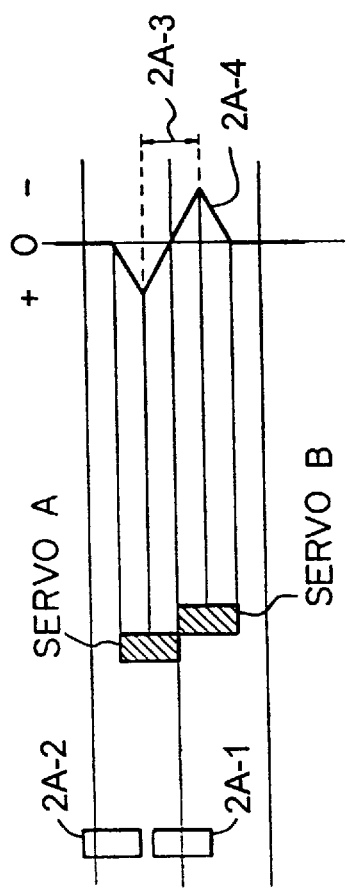
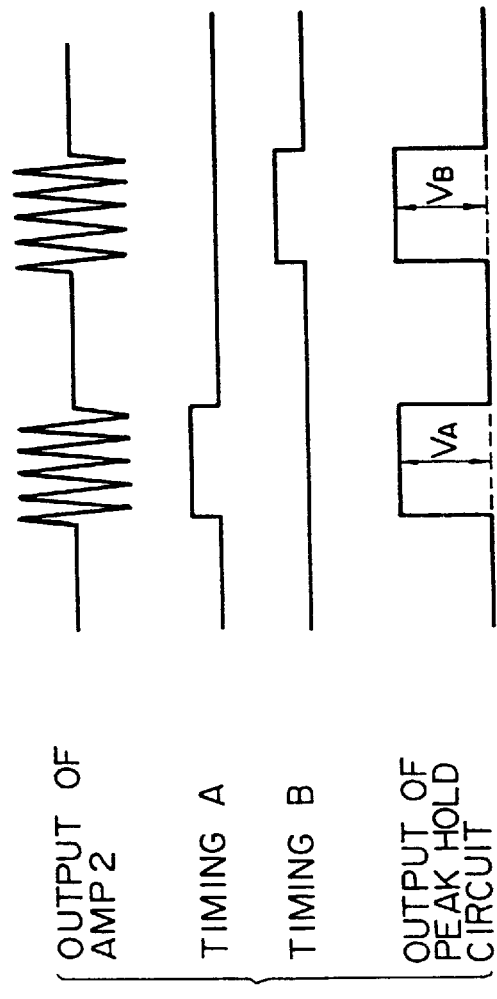
Fig. 2(A) PRIOR ART
Fig. 2(B) PRIOR ART

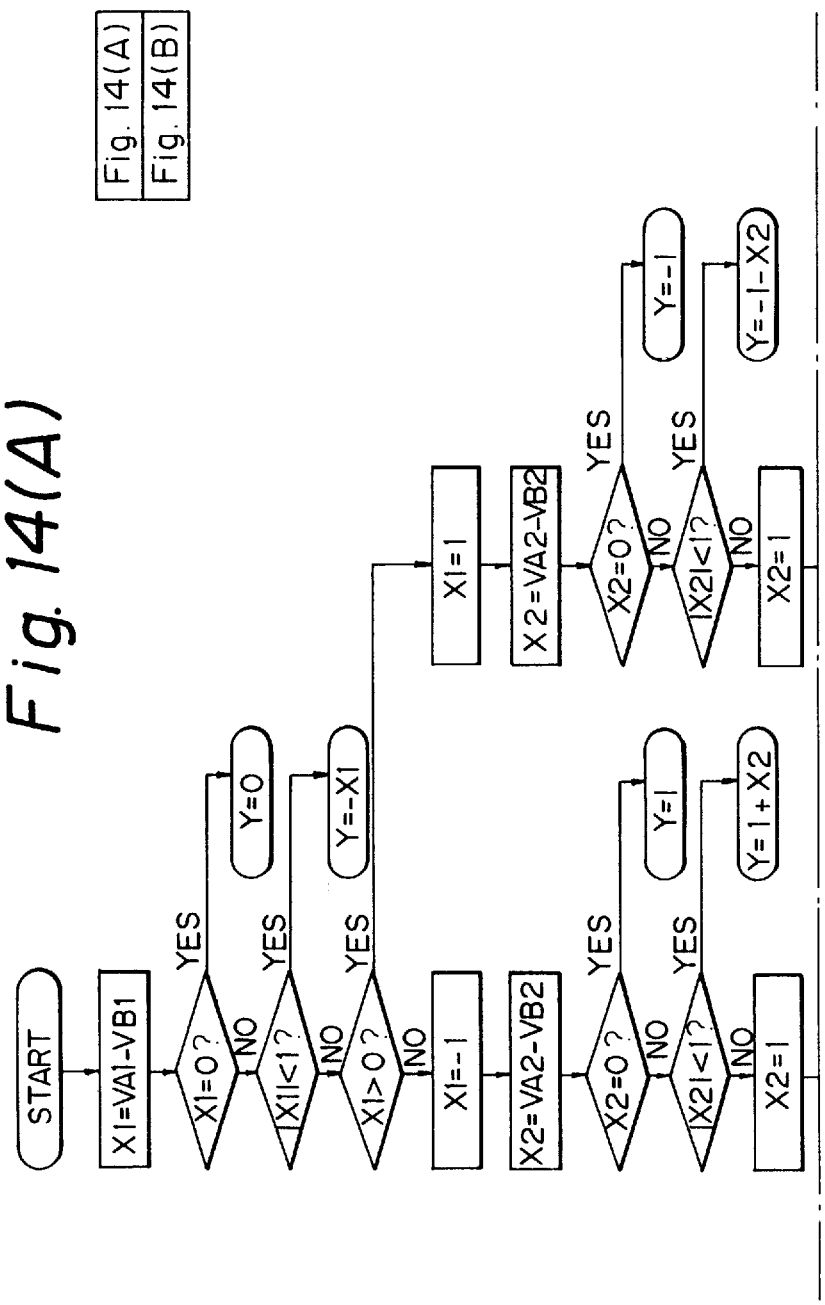

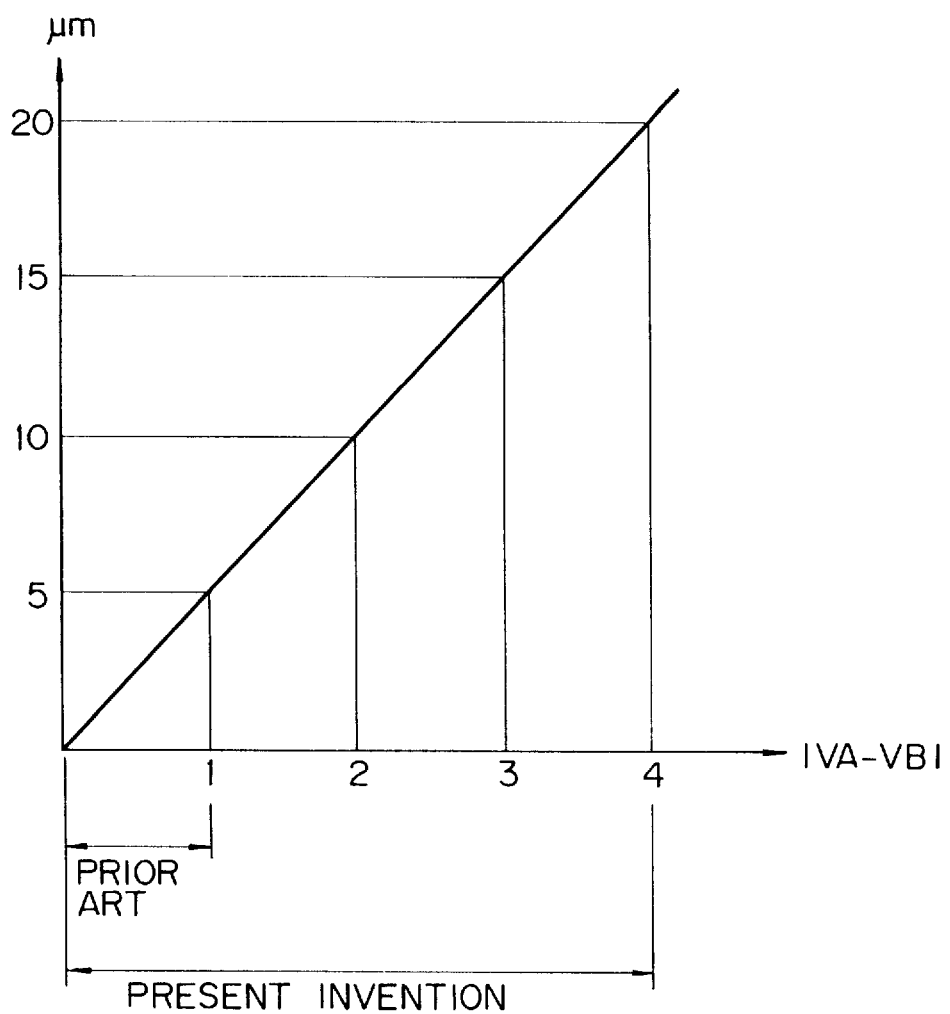

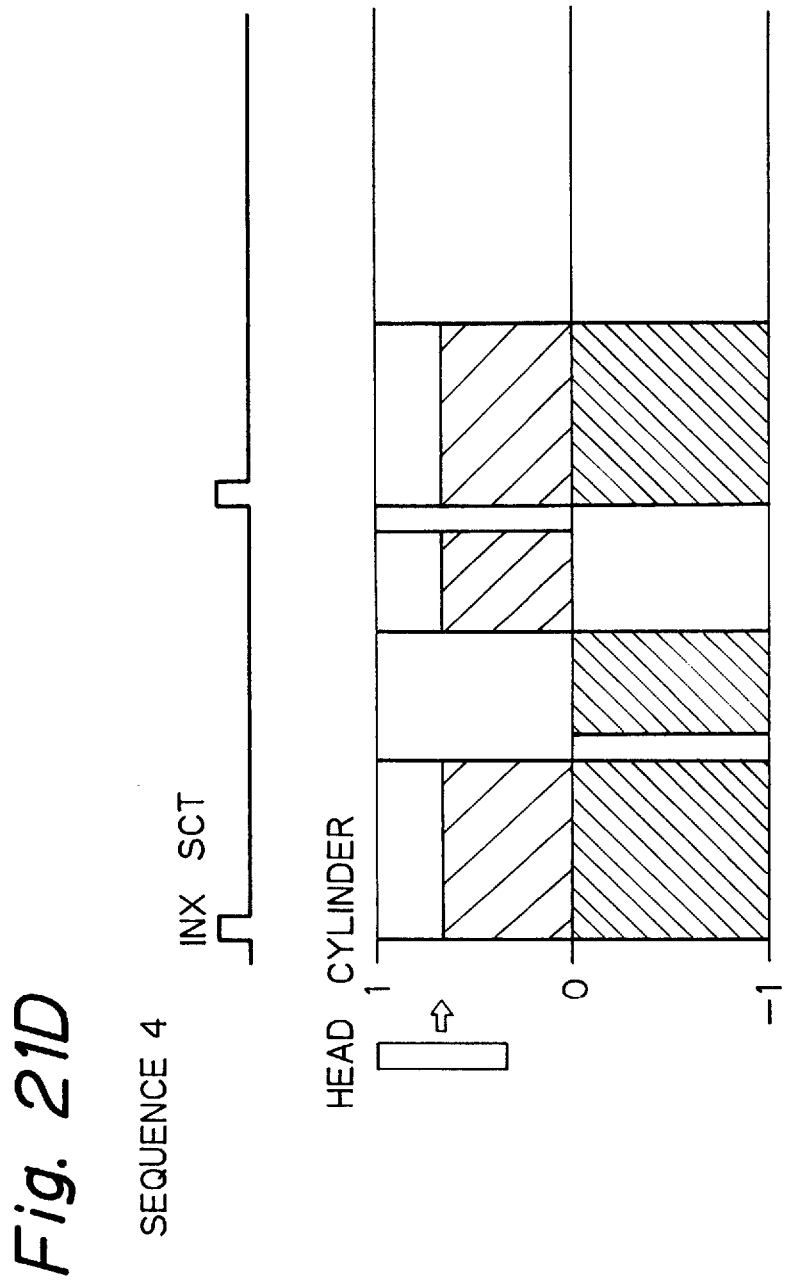

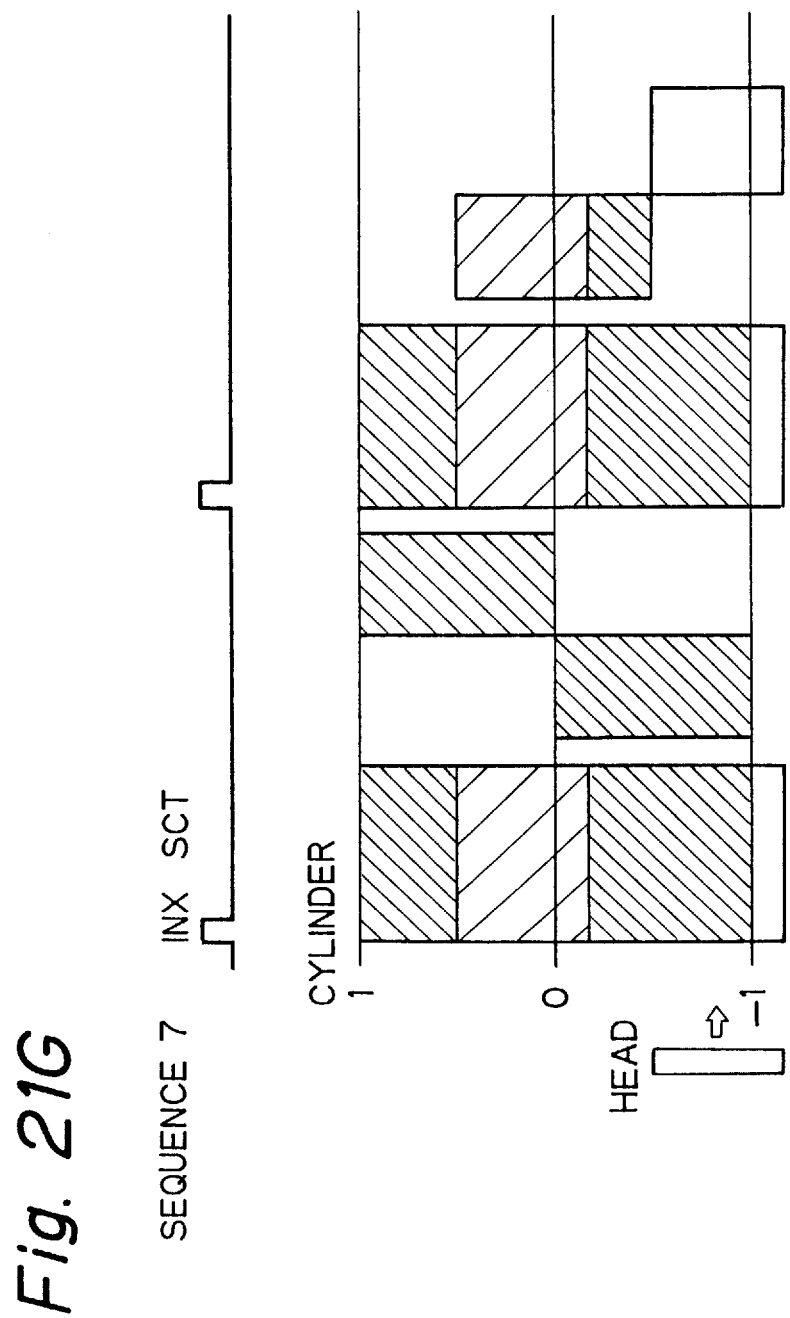

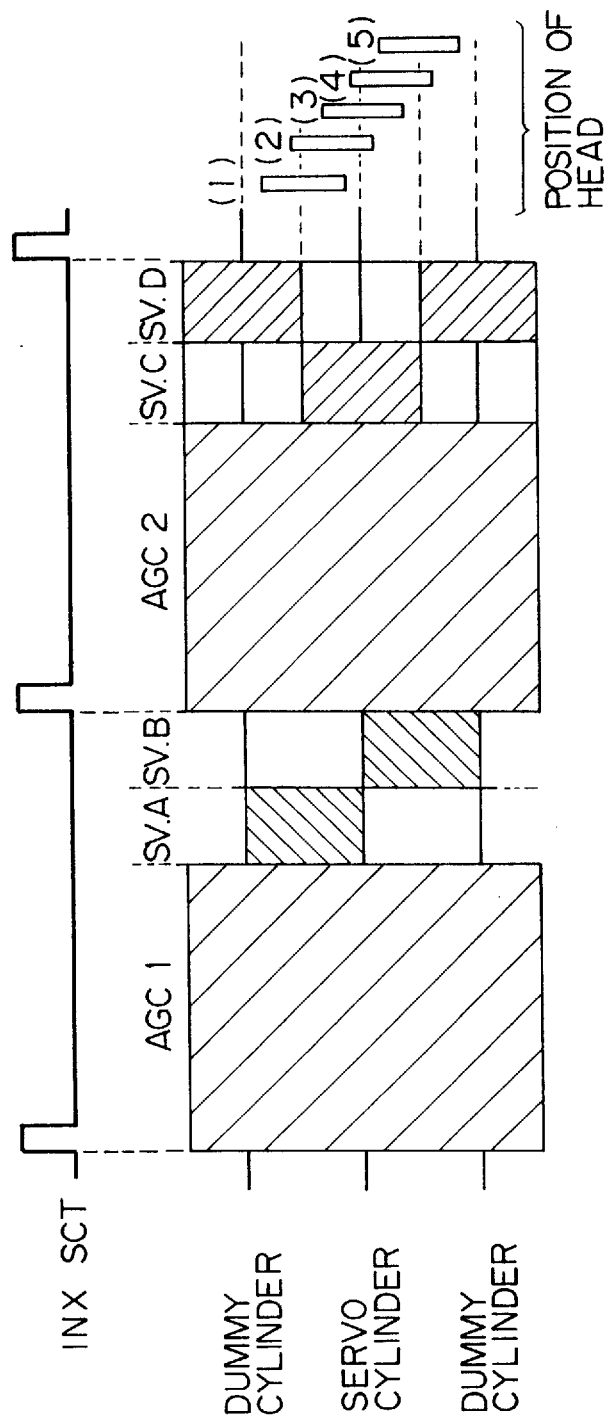

Fig. 23(B)
POSITION OF HEAD
(5) INNER SIDE LARGE OFF-TRACK
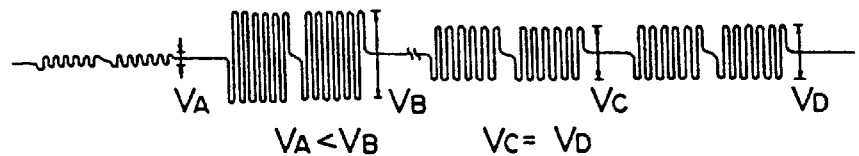
$V_A$      $V_B$      $V_C$      $V_D$
$V_A < V_B$      $V_C = V_D$
(4) INNER SIDE SMALL OFF-TRACK
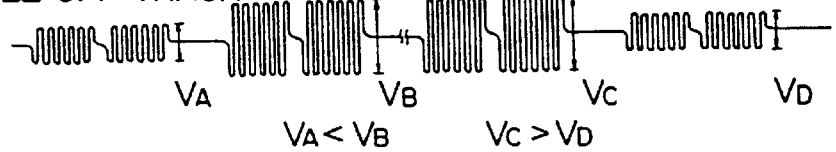
$V_A$      $V_B$      $V_C$      $V_D$
$V_A < V_B$      $V_C > V_D$
(3) ON TRACK
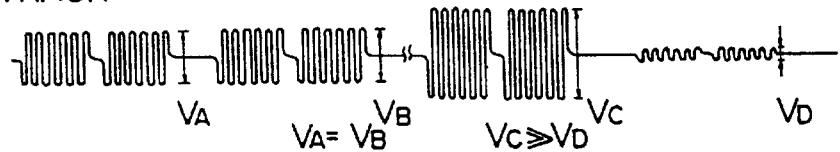
$V_A$      $V_B$      $V_C$      $V_D$
$V_A = V_B$      $V_C \gg V_D$
(2) OUTER SIDE SMALL OFF-TRACK
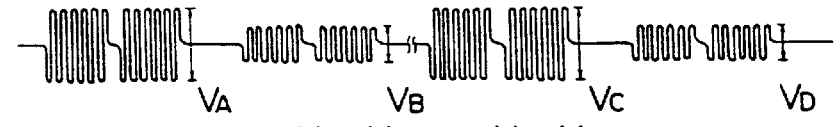
$V_A$      $V_B$      $V_C$      $V_D$
$V_A > V_B$      $V_C > V_D$
(1) OUTER SIDE LARGE OFF-TRACK
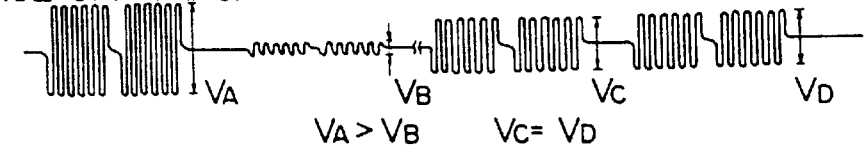
$V_A$      $V_B$      $V_C$      $V_D$
$V_A > V_B$      $V_C = V_D$
READ WAVEFORMS OF SERVO INFORMATION

APPARATUS AND METHOD OF DETECTING HEAD POSITION ERROR IN MAGNETIC DISK DRIVE

RELATED APPLICATION

This is a continuation of application Ser. No. 07/956,069, filed on Oct. 2, 1992, now abandoned.

BACKGROUND OF THE INVENTION

1. Field of the Invention

This invention relates to a magnetic disk drive for effecting positioning control of a head by the use of servo data on a servo surface and data surface. More particularly, it relates to an apparatus and method of detecting a head position error which can correctly detect a position error of the head even when a position error distance of the head is substantially larger than a track gap in the data surface.

As storage capacity and recording density has increased in recent magnetic disk drive, the track gap and core width of a head has become smaller. In contrast, it is difficult to greatly change absolute quantities such as eccentricity of a medium such as a rotary disk, deviation between heads, and so forth. In other words, the relative proportions of eccentricity, deviation between heads, and so forth, appears to have increased. As a result, even when a servo head is allowed to precisely follow a target track on the servo surface, a deviation distance of a data head from a target track cannot be neglected when the head is deviated from the target track due to influences such as a temperature fluctuation. Under these circumstances, the present invention pertains to one strategy for precisely detecting a position error distance of a head.

2. Description of the Related Art

When a track gap becomes smaller and a track density becomes higher as described above, conventional head positioning control using servo data of only a servo surface sometimes fails to read out the data because the data head on the data surface, which is subjected to ontrack control by the servo data of the servo surface, is more likely to go offtrack when the environment where the disk apparatus is used changes, particularly when an ambient temperature changes from a low temperature to a high temperature or vice versa.

Therefore, a head position error detection method for detecting and correcting a position error, which also records servo data on the data surface and uses the servo data of both the servo surface and the data surface, has been proposed.

Various data surface servo systems utilizing servo data recorded on the data surface are known. Generally, these systems write servo data into a certain cylinder on the data surface in which data is not recorded, detect a position error distance of the data head from this servo data, and effect error correction.

When the track gap becomes small, the position error distance of the data head extends to regions of adjacent tracks, and in such a case, also, the position error of the head must be detected and error correction must be made.

FIG. 1 is a block diagram for explaining an example of the prior art, and FIG. 2 is a diagram showing servo patterns of the prior art.

In FIGS. 1 and 2, a data head 1 reads servo data recorded in an N cylinder of a disk and sends the data to an amplification circuit (AMP) 2. After amplifying this servo data, the amplification circuit 2 sends it to peak hold circuits 3 and 4.

The servo data are recorded in the N cylinder of the disk as represented by servo A and servo B in FIG. 2(A). In other words, the servo A is recorded in an N−1 cylinder from the center of the N cylinder, while the servo B is recorded in an N+1 cylinder from the center of the N cylinder.

Accordingly, when the data head 1 is positioned at the center of the N cylinder as represented by 1 in FIG. 2(A), the amplification circuit 2 sends waveforms having equal amplitude to the peak hold circuits 3 and 4 as represented by the output of the amplification circuit 2 in FIG. 2(B).

A timing generation circuit 5 outputs a timing signal for holding the peak value of the waveform as a result of reading the servo A, to the peak hold circuit 3, and outputs a timing signal for holding the peak value of the waveform obtained by reading the servo B, to the peak hold circuit 4, as represented by the timings A and B in FIG. 2(B), respectively.

Therefore, the peak hold circuit 3 sends the peak value $V_A$ to a differential amplification circuit 6 and the peak hold circuit 4 sends the peak value $V_B$ to the differential amplification circuit 6 as represented by the outputs of the peak hold circuits shown in FIG. 2(B).

The differential amplification circuit 6 determines the difference ($V_A-V_B$) between the peak values $V_A$ and $V_B$ and sends the difference to an A/D conversion circuit 7. The A/D conversion circuit 7 converts the analog value ($V_A-V_B$) to a digital value and sends it to a signal processing unit such as a processor 8.

When the position of the data head 1 indicated by 2A-1 in FIG. 2(A) deviates towards the N−1 cylinder from the center of the N cylinder, for example, the quantity of the servo A read by the data head 1 becomes greater than the quantity read of the servo B, and for this reason, the peak value $V_A$ becomes greater than the peak value $V_B$.

Therefore, the difference becomes progressively greater towards the + side, for example, with the increasing deviation quantity of the data head 1 as indicated by 2A-4 in FIG. 2(A), and when the deviation quantity of the data head 1 reaches ½ of the core width, the data head 1 reads only the servo A and can no longer read the servo B, so that the difference of the peak values becomes maximum. This difference becomes progressively smaller when the deviation quantity becomes greater, and when the data head 1 becomes unable to read the servo A, the output of the differential circuit 6 becomes zero (0).

When the position of the data head 1 deviates to the N+1 cylinder from the center of the N cylinder, the condition is the same as described above except that the difference ($V_A-V_B$) is on the negative (−) side as shown in FIG. 2(A). Therefore, the detailed explanation of this case will be omitted.

A signal processing unit 8 detects the position error distance of the data head 1 and its direction from the polarity + or −, and from the degree of the output of the A/D conversion circuit 7 within the range where the absolute value of ($V_A-V_B$) is maximum, that is, within the range indicated by 2A-3 in FIG. 2(A).

As described above, it has been a customary practice to detect the position error distance of the data head 1 and the position error direction within the range indicated by 2A-3 in FIG. 2(A) and to effect the data surface servo control. This is because the degree of the output of the A/D conversion circuit 7 does not represent the deviation quantity of the data head 1 from the N cylinder outside the range indicated by 2A-3 in FIG. 2(A).

However, the range of 2A-3 in FIG. 2(A) is narrow with respect to each cylinder adjacent thereto and is about 0.3 of the cylinder gap, i.e., 0.3 data track. Therefore, even if the position error distance of the data head 1 positioned by the servo surface servo remains the same as in the prior art, the proportion of its relative position error becomes greater when the cylinder gap becomes smaller and the number of disks increases to attain a greater capacity, and the head position deviates outside the range 2A-3 in FIG. 2(A). This invites a problem in that the detection of the position error distance for effecting the data surface servo control cannot be carried out.

In other words, the maximum correction quantity for the two adjacent tracks is about 60% of the data track pitch. Moreover, the correction quantity for which linearity can be insured reliably is only about half of the track pitch. Accordingly, when eccentricity of the rotary medium and the deviation between the heads increases, the correction value loses its linearity and positioning cannot be made by a correct servo constant, so that the positioning time is extended.

SUMMARY OF THE INVENTION

It is therefore an object of the present invention to provide an apparatus and method of detecting a head position error which can correctly detect the position error distance of the data head, even when the above position error becomes larger due to the increase of relative proportions of eccentricity and deviation between heads as storage capacity and recording density have increased.

It is further object of the present invention to provide an apparatus and method of detecting correctly the position error distance of the data head by utilizing a plurality of kinds of patterns allocated in plural regions more than a prior art.

To accomplish the objects described above, in a disk drive for detecting a position error distance of the data head with respect to a measuring cylinder of a data surface of a disk by reading servo data recorded in a measuring cylinder, the apparatus of detecting a head position error according to the present invention includes means for reading patterns written in advance relating to a plurality of kinds of servo data in at least three regions on the outer or inner peripheral side of the measuring cylinder or in both of them; and means for detecting an accurate position error distance of the data head by comparing the results with each other obtained by reading a plurality of times a plurality of kinds of the patterns.

Preferably, the apparatus of detecting head position error described above further includes means for reading patterns written in advance relating to a plurality of kinds of servo data in at least three regions on the outer and inner peripheral sides of the measuring cylinder; means for detecting a rough position error distance of the data head from the measuring cylinder on the basis of the combination of parts of a plurality of kinds of the patterns; means for detecting a detailed position error distance of the data head on the basis of the combination of other parts of a plurality of kinds of the patterns; and means for determining an accurate position error distance by comparing and totalling the rough position error distance and the detail position error distance.

Further preferably, the apparatus of detecting head position error described above includes means for recording first servo data on the outer peripheral side from the center of the measuring cylinder and second servo data on the inner peripheral side; and means for recording first servo data from positions spaced apart by substantially ½ of the core width of the data head on the outer and inner peripheral sides of the measuring cylinder from the center thereof, respectively, and recording second servo data on the outer and inner peripheral sides of the measuring cylinder to a length substantially ½ of the core width of the data head.

Further preferably, the apparatus of detecting head position error detection method described above includes means for allocating a plurality of regions in such a manner as to continue on the outer and inner peripheral sides of the measuring cylinder from the center of the measuring cylinder by center allocation with a core width of the data head being a unit, recording the combinations of a plurality of first patterns for dividedly detecting a plurality of the regions, and recording second patterns for detecting a position error distance of the data head, by allocating them respectively to the outer and inner peripheral sides with the boundary of each of the regions and the center line of each of the regions being the centers, respectively; and means for detecting the position error distance inside the regions detected from the combination of a plurality of kinds of the first patterns read by the data head and in accordance with the second patterns inside the detection regions, as the position error distance of the data head with respect to the measuring cylinder.

On the other hand, the method of detecting a head position error according to the present invention includes a step of reading patterns written in advance relating to a plurality of kinds of servo data in at least three regions on the outer or inner peripheral side of the measuring cylinder or in both of them; and a step of detecting an accurate position error distance of the data head by comparing the results with each other obtained by reading a plurality of times a plurality of kinds of the patterns.

Further, the position error detection method described above includes a step of reading patterns allocated in advance relating to a plurality of kinds of servo data in at least three regions on the outer and inner peripheral sides of the measuring cylinder; a step of detecting a rough position error distance of the data head from the measuring cylinder on the basis of the combination of parts of a plurality of kinds of the patterns; a step of detecting a detailed position error distance of the data head on the basis of the combination of other parts of a plurality of kinds of the patterns; and a step of determining an accurate position error distance by comparing and totalling the rough position error distance and the detail position error distance.

Alternatively, the apparatus of detecting head position error according to the present invention includes means for dividing a plurality of kinds of the patterns which are written in advance patterns relating to a plurality of kinds of servo data in predetermined regions on the outer and inner peripheral sides of the measuring cylinder, into a plurality of phases (for example, into two phases), and reading them at mutually different timings; and means for comparing the patterns read at each of the phases and selecting the pattern having higher linearity as true data of the position error distance.

Further, the position error detecting method according to the present invention includes a step of dividing a plurality of kinds of the patterns which are written in advance relating to a plurality of kinds of servo data in predetermined regions on the outer and inner peripheral sides of the measuring cylinder, into a plurality of phases (for example, into two phases), and reading them at mutually different timings; and a step of comparing the patterns read at each of the phases and selecting the pattern having higher linearity as true data of the position error distance.

In this case, processes other than the read operation of a plurality of kinds of the patterns are executed at a timing of automatic gain control (AGC).

According to the present invention, a plurality of kinds of detection patterns are allocated in advance to the outer and inner peripheral sides of the measuring cylinder so as to detect the head position error over a plurality of cylinders, and the head position error distance is determined by comparing the results obtained by dividedly reading these detection patterns a plurality of times and feeding them back. Accordingly, the present invention insures linearity of detection characteristics over a broader range than in the prior art and the position error can be detected correctly.

BRIEF DESCRIPTION OF THE DRAWINGS

The above objects and features of the present invention will become more apparent from the following description of the preferred embodiments when taken in conjunction with the accompanying drawings, in which:

FIGS. 2(A) and 2(B) are diagrams showing servo patterns of the prior art;

FIGS. 14(A) and 14(B) are flowcharts for explaining a series of operations of FIG. 13;

FIG. 15 is a graph for explaining the effects of FIG. 12;

FIGS. 21A to 21J are diagrams showing write sequences of servo patterns which are written in accordance with the timing shown in FIG. 20;

FIGS. 23(A) and 23(B) are explanatory views showing definite examples of the waveforms read at each head position in FIG. 20.

DESCRIPTION OF THE PREFERRED EMBODIMENTS

Figure 3:
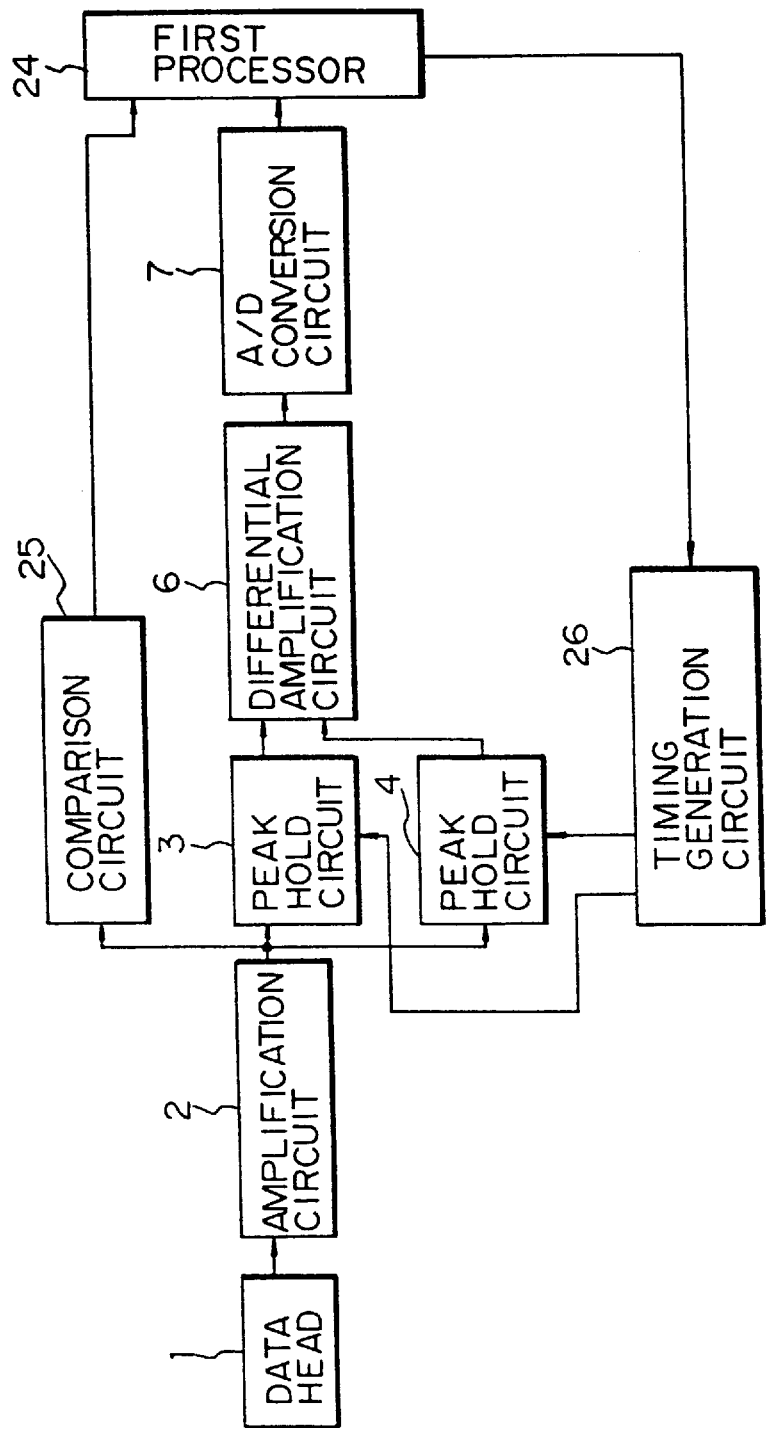
FIG. 3 is a block circuit diagram showing a first preferred embodiment of the present invention.
Figure 4:
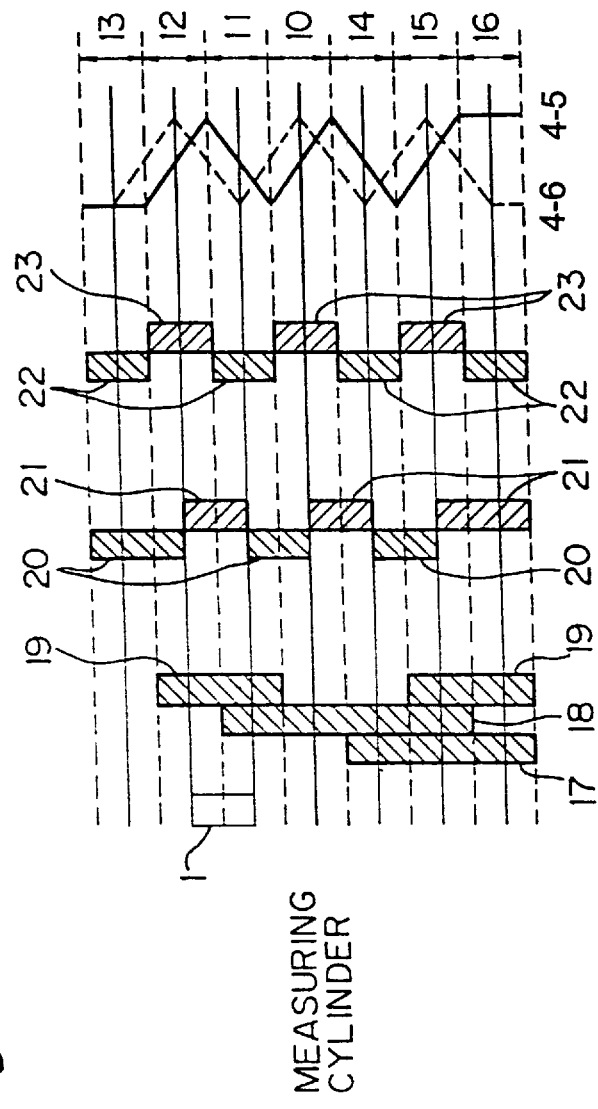
FIG. 4 is a diagram showing servo patterns of a first preferred embodiment of the present invention.

FIG. 3 is a block circuit diagram showing a first preferred embodiment of the present invention, and FIG. 4 is a diagram showing servo patterns of the first preferred embodiment.

Figure 1:
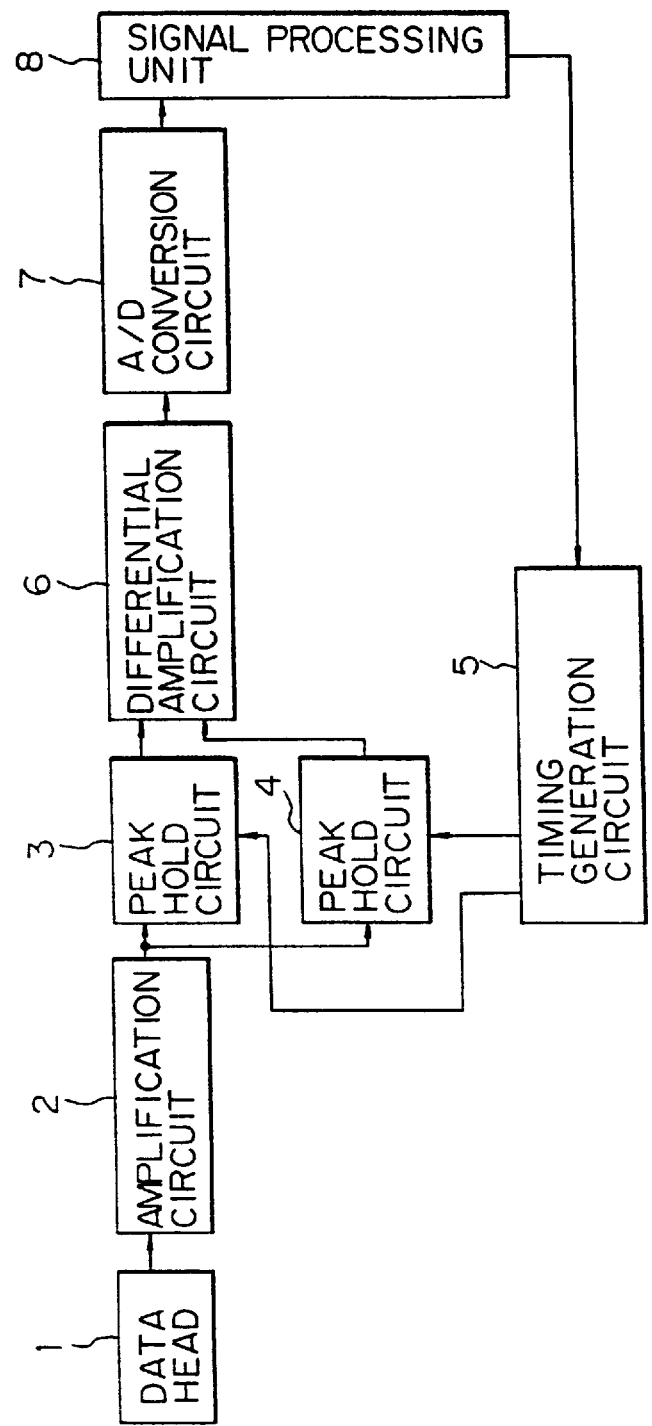
FIG. 1 is an explanatory view for explaining the prior art.

In FIG. 3, like reference numerals are used to identify circuit constituents having the same function as those of FIG. 1. FIG. 4 shows an example of the servo patterns in the present invention, wherein reference numerals 10 to 16 represent a plurality of regions which are allocated continuously to the outer and inner peripheral sides of a measuring cylinder from the center of the measuring cylinder using a core width of the data head 1 as a unit for center allocation. Generally, it should be noted that such servo patterns are repeatedly written over one round of measuring cylinder, i.e., each track.

Reference numerals 17 to 19 represent detection patterns for dividedly detecting the regions 10 to 16. In other words, the pattern 17 is recorded within a range extending from the boundary between the regions 10 and 14 to the region 16, the pattern 18 is recorded within a range extending from the boundary between the regions 11 and 12 to the boundary between the regions 15 and 16, and the pattern 19 is recorded within a range extending from the boundary between the regions 12 and 13 to the boundary between the regions 10 and 11, and within a range extending from the boundary between the regions 14 and 15 to the region 16.

When the data head 1 is positioned on the center of the measuring cylinder, the data head 1 reads the data as "010", and this represents that the data head is positioned inside the region 10.

When the data head 1 is inside the region 11, the data is read as "011" and when the data head 1 is inside the region 12, the data is read as "001". When the data head 1 is inside the region 13, the data is read as "000".

Furthermore, when the data head 1 is positioned inside the region 14, the data is read as "110", when it is inside the region 15, the data is read as "111" and when it is inside the region 16, the data is read as "101".

The patterns 17 to 19 read by the data head 1 are amplified by the amplification circuit 2, and are sent to the comparison circuit 15 and to the peak hold circuits 3 and 4. The timing generation circuit 26 generates a timing signal which sets the comparison circuit 25 to ENABLE, under the control of the processor 24. Accordingly, the comparison circuit 25 compares the patterns 17 to 19 read by the data head 1 with a predetermined threshold value.

This predetermined threshold value is set to ½ of the level generated by the amplification circuit 2 at the time of read-out of the pattern 18 when the data head 1 is positioned to the center of the measuring cylinder, for example.

Accordingly, when the data head 1 is positioned on the boundary between the regions 11 and 12 as shown in FIG. 4, for example, the comparison circuit 25 sets the read value of the pattern 18 to "1" when at least ½ of the width of the core width of the data head 1 is within the range 11, and sets the read value to "0" when the width is below ½.

The first processor 24 recognizes in which of the regions the data head 1 is positioned, from the comparison result of the comparison circuit 25. In other words, it recognizes that the data head 1 is inside the region 11 when the comparison circuit 25 shows the comparison result as "011".

When the data head 1 reads the pattern 20 for detecting the position error, the timing generation circuit 26 outputs this read timing to the peak hold circuit 3, and when the data head 1 reads the pattern 21, the timing generation circuit 26 outputs this read timing to the peak hold circuit 4. Subsequently, when the data head 1 reads the pattern 22 for detecting the position error, the timing generation circuit 26 outputs this read timing to the peak hold circuit 3, and when the former reads the pattern 23, the latter outputs this read timing to the peak hold circuit 4.

The differential amplification circuit 6 obtains the difference of the peak values of the patterns 20 and 21 held by the peak hold circuits 3 and 4 in the manner already described, sends this difference to the processor 24 through the A/D conversion circuit 7, determines subsequently the difference of the peak values of the patterns 22 and 23 and sends the result to the first processor 24 through the A/D conversion circuit 7.

The difference of the peak values of the patterns 20 and 21 changes as shown in FIG. 4 at 4-5 and the difference of the peak values of the patterns 22 and 23 changes as shown in FIG. 4 at 4-6. In other words, the curve indicated by 4-5 makes it possible to detect the position error distance of the data head 1 from the center line of each of the regions 10, 11, 12, 14 and 15, and the curve 4-6 makes it possible to detect the position error distance of the data head 1 from the boundary between the regions 12 and 13, the boundary between the regions 11 and 12, the boundary between the regions 10 and 11, the boundary between the regions 10 and 14, the boundary between the regions 14 and 15, and the boundary between the regions 15 and 16.

Assuming that the data head 1 is positioned on the boundary between the regions 11 and 12 as shown in FIG. 4 and even when the comparison result of the comparison circuit 25 proves to be wrong, the first processor 24 detects the position error distance from the measuring cylinder from the detection result of the peak values of the patterns 22 and 23 represented by 4-6 in FIG. 4.

In other words, the difference in the peak values of the patterns 22 and 23 is 0 and the difference in the peak value of the patterns 20 and 21 exhibits the greatest value. Therefore, even when the comparison circuit 25 judges the read result of the patterns 17 to 19 as "011" and indicates that the data head 1 is inside the region 11, or even when it judges the read result as "001" and indicates that the data head 1 is inside the region 12, the processor 24 judges that the data head 1 is on the boundary between the regions 11 and 12.

Figure 5:
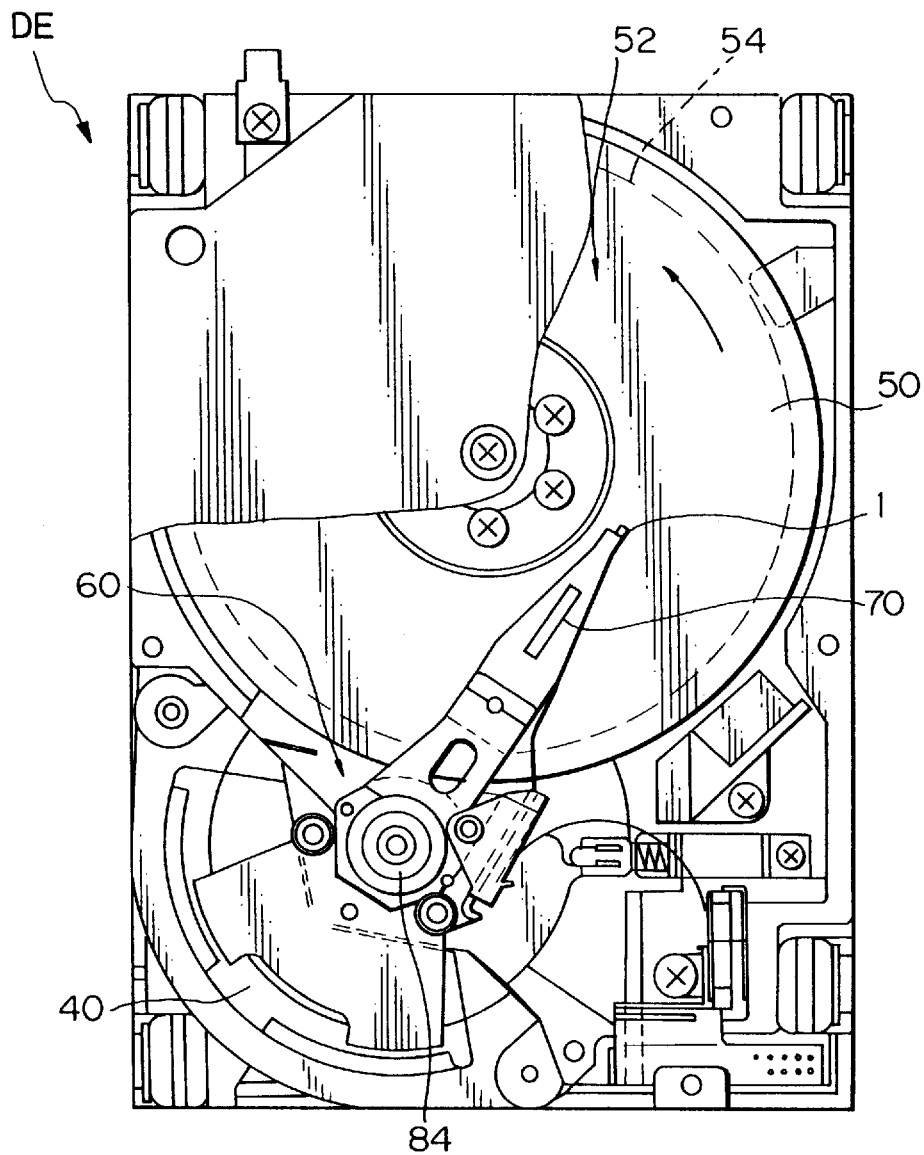
FIG. 5 is a partially broken top view for explaining a disk unit to which the present invention is applied.
Figure 6:
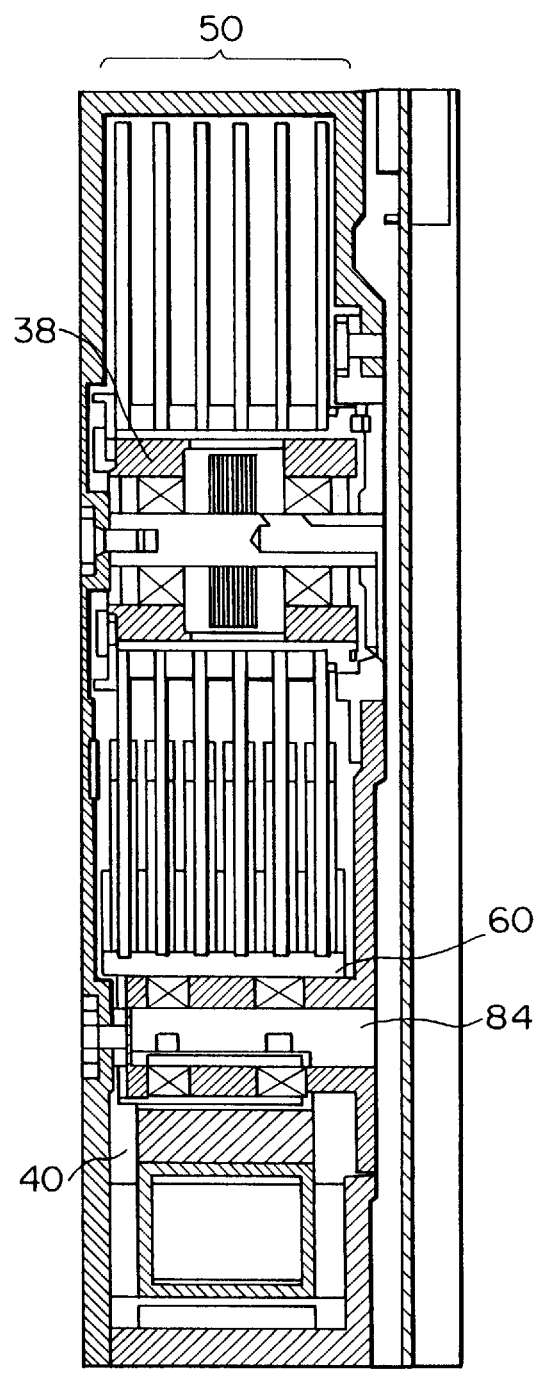
FIG. 6 is a sectional side view of FIG. 5.

FIGS. 5 and 6 show the structure of the magnetic disk unit which is applied to the present invention. As shown in FIG. 5, a magnetic disk 50 is disposed inside a disk enclosure (DE) and as can be seen clearly from FIG. 6, six magnetic disks 50 are disposed in this embodiment. These magnetic disks 50 can be rotated by a disk driving unit 38.

The data head 1 is fitted to the tip of an arm 70 of a head actuator 60, and is driven by a voice coil motor (VCM) 40 with a shaft 84 being the center.

In FIG. 5, a plurality (e.g., 1,000 to 1,500) of tracks 52 for storing the data are formed in concentric circles on the surface of the magnetic disk 50. A portion of these tracks, such as the outer peripheral portion, is utilized for recording servo data. This is illustrated as the measuring cylinder 54. In the present invention, patterns such as patterns 17 to 23 in FIG. 4 are allocated in advance over several tracks on both outer and inner peripheral sides of the measuring cylinder.

Figure 7:
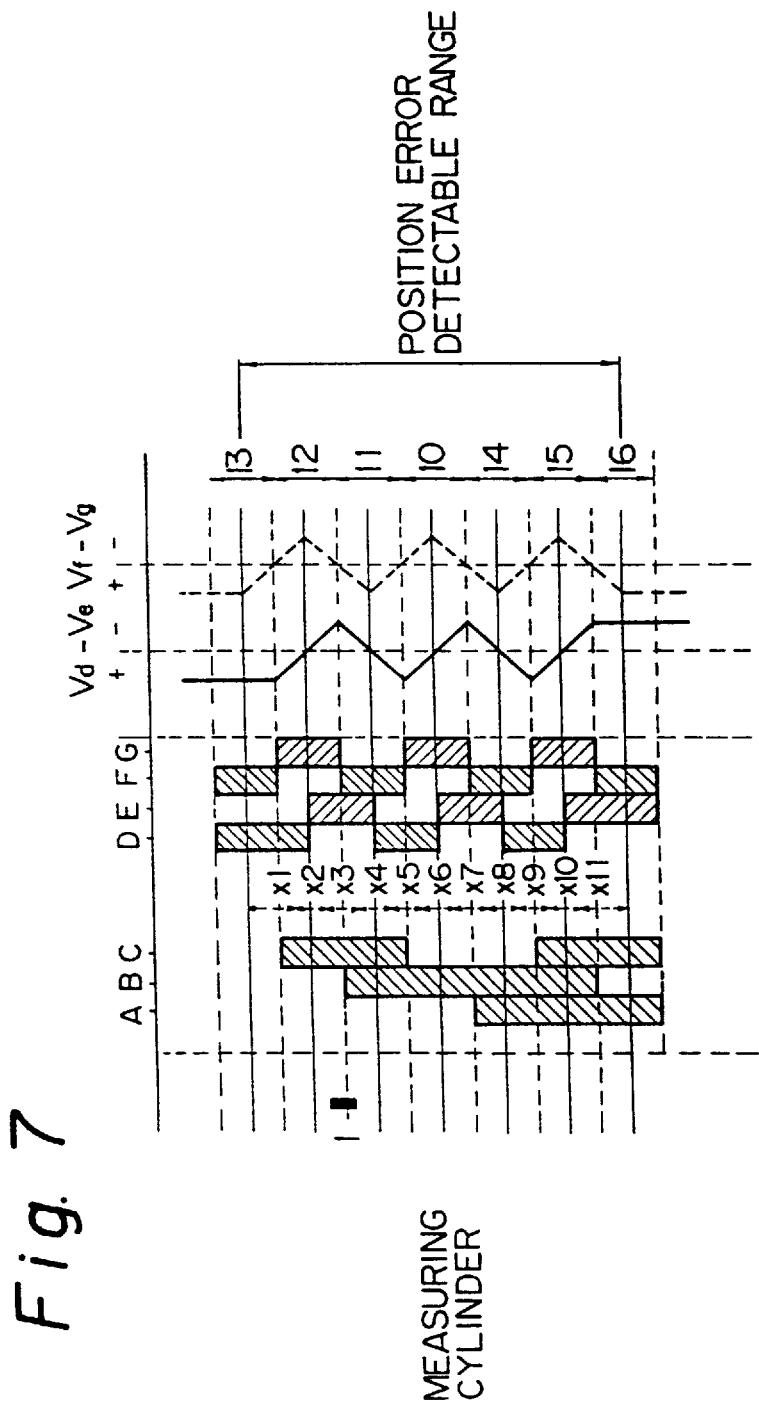
FIG. 7 is a diagram for explaining more definitely the apparatus shown in FIG. 4.
Figure 8:
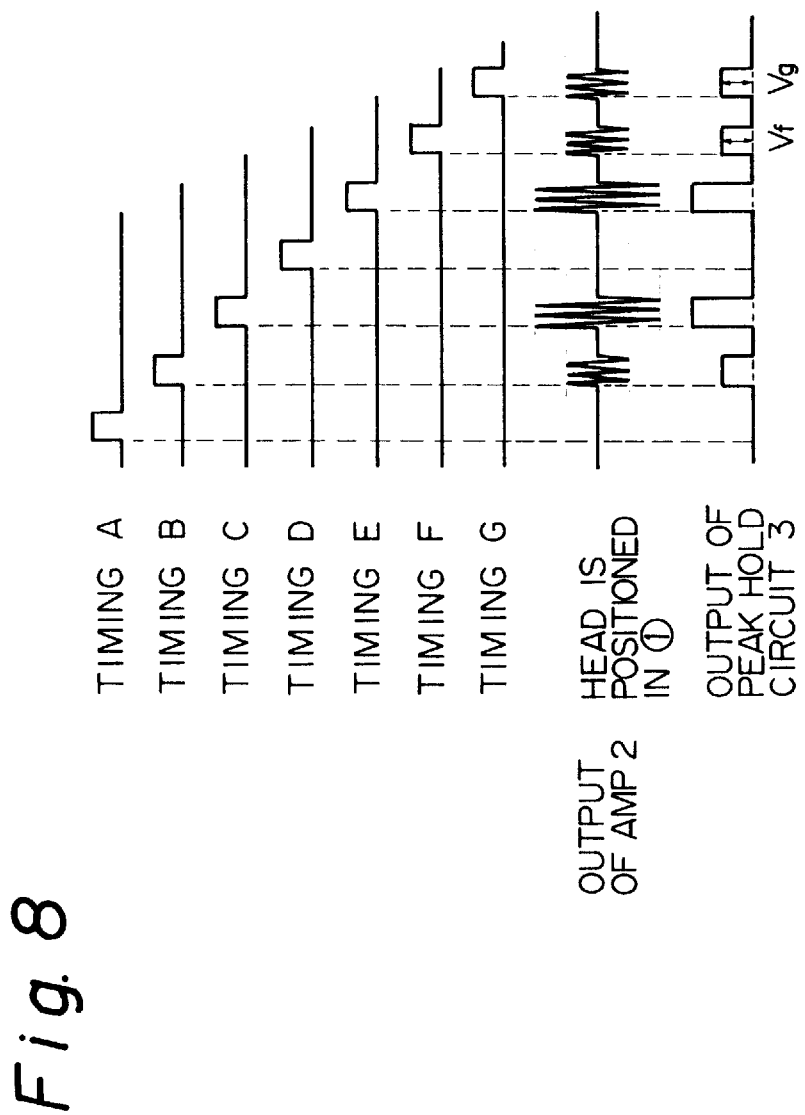
FIG. 8 is a timing chart for explaining a series of operations of the apparatus shown in FIG. 7.
Figure 9A:
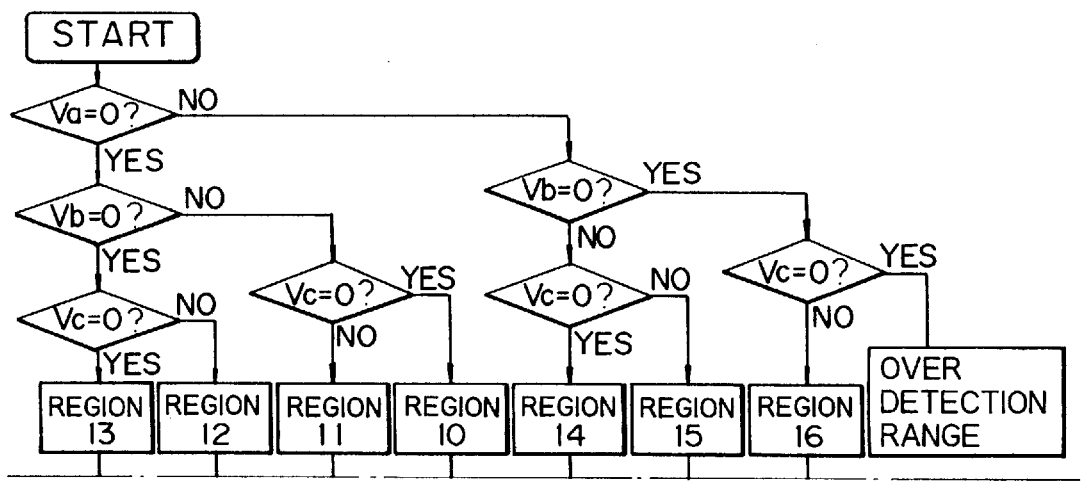
FIGS. 9(A) and 9(B) are flowcharts for explaining the operations of the prior half of the apparatus shown in FIG. 7.
Figure 9B:
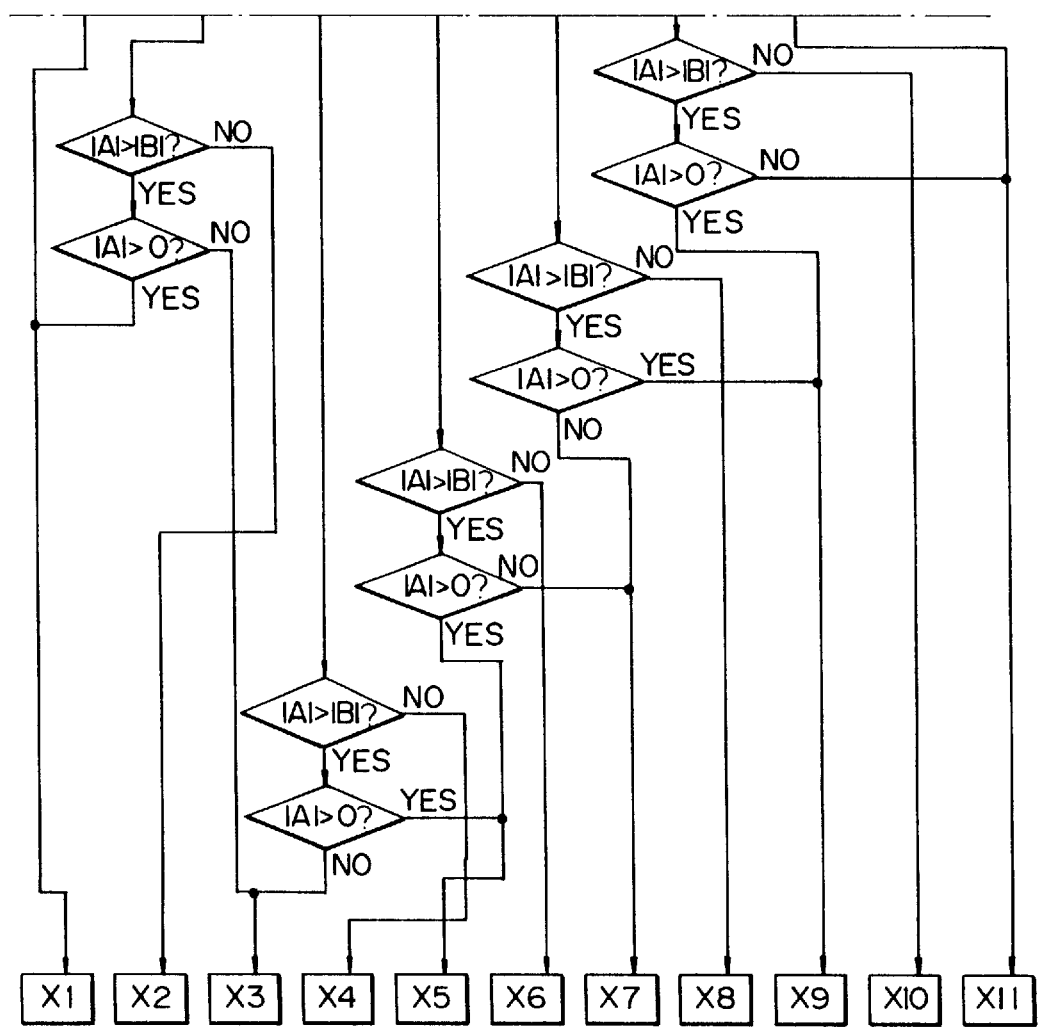
Figure 10:
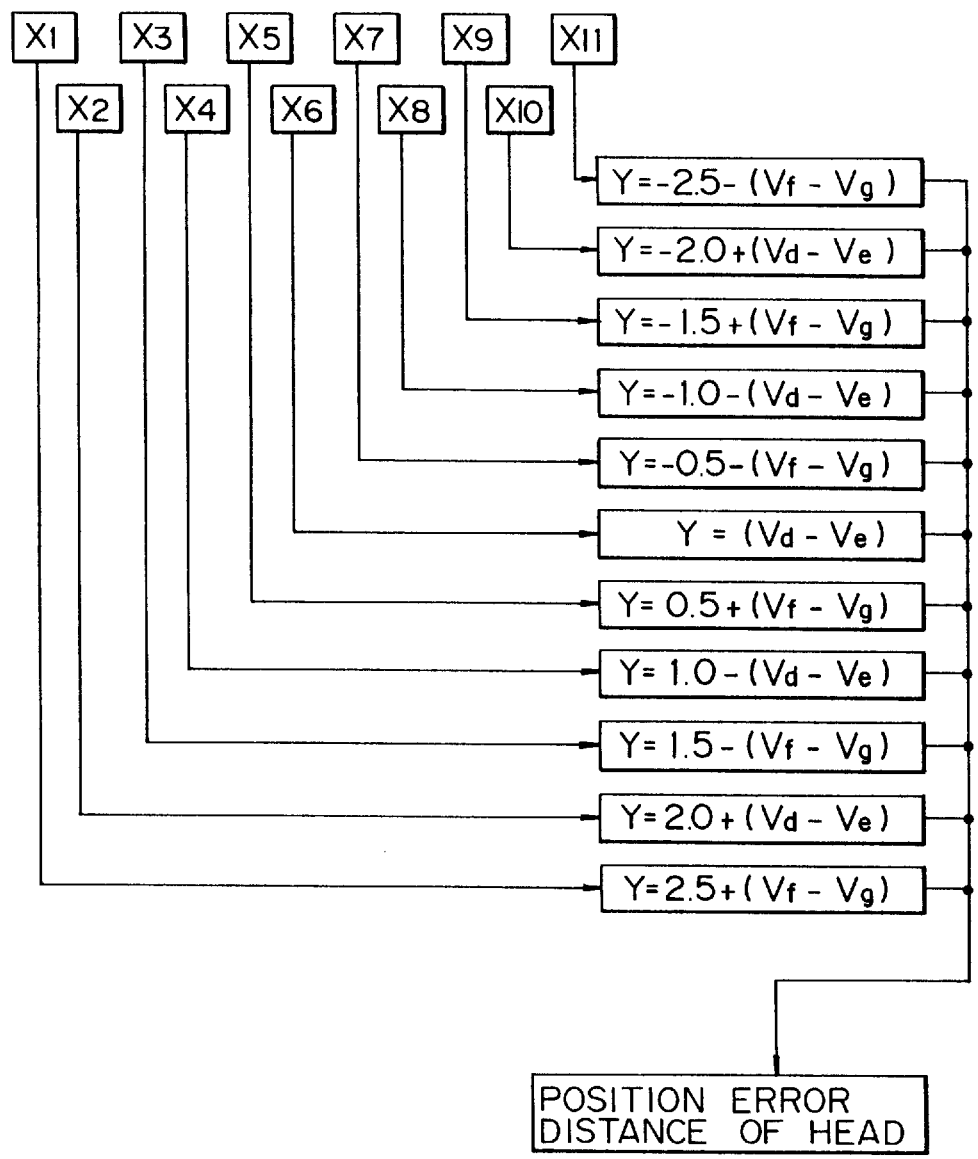
FIG. 10 is a flowchart useful for explaining the operations of the latter half of the apparatus shown in FIG. 7.

FIGS. 7, 8, 9 and 10 are diagrams for explaining more definitely the operations of the first preferred embodiment of the present invention. In more detail, FIG. 7 shows definite examples of position error detectable ranges and head positions, FIG. 8 is a timing chart showing output waveforms when the data head 1 is positioned at a position 1, and FIGS. 9 and 10 are flowcharts for explaining a series of procedures for the position error detection. At timings A, B and C shown in FIG. 8, patterns comprising the combination of "0" and "1" such as "011" are read. In FIG. 9, the read patterns and the pattern inside the comparison circuit 25 are sequentially compared, and the presence of the data head 1 in the proximity of the region 11 can be detected. The presence of the data head 1 at the boundary between the regions 11 and 12 is confirmed at the timing D, E, F and G as shown in FIGS. 8 and 10, and the position error distance of the data head can be detected accurately.

Figure 11:
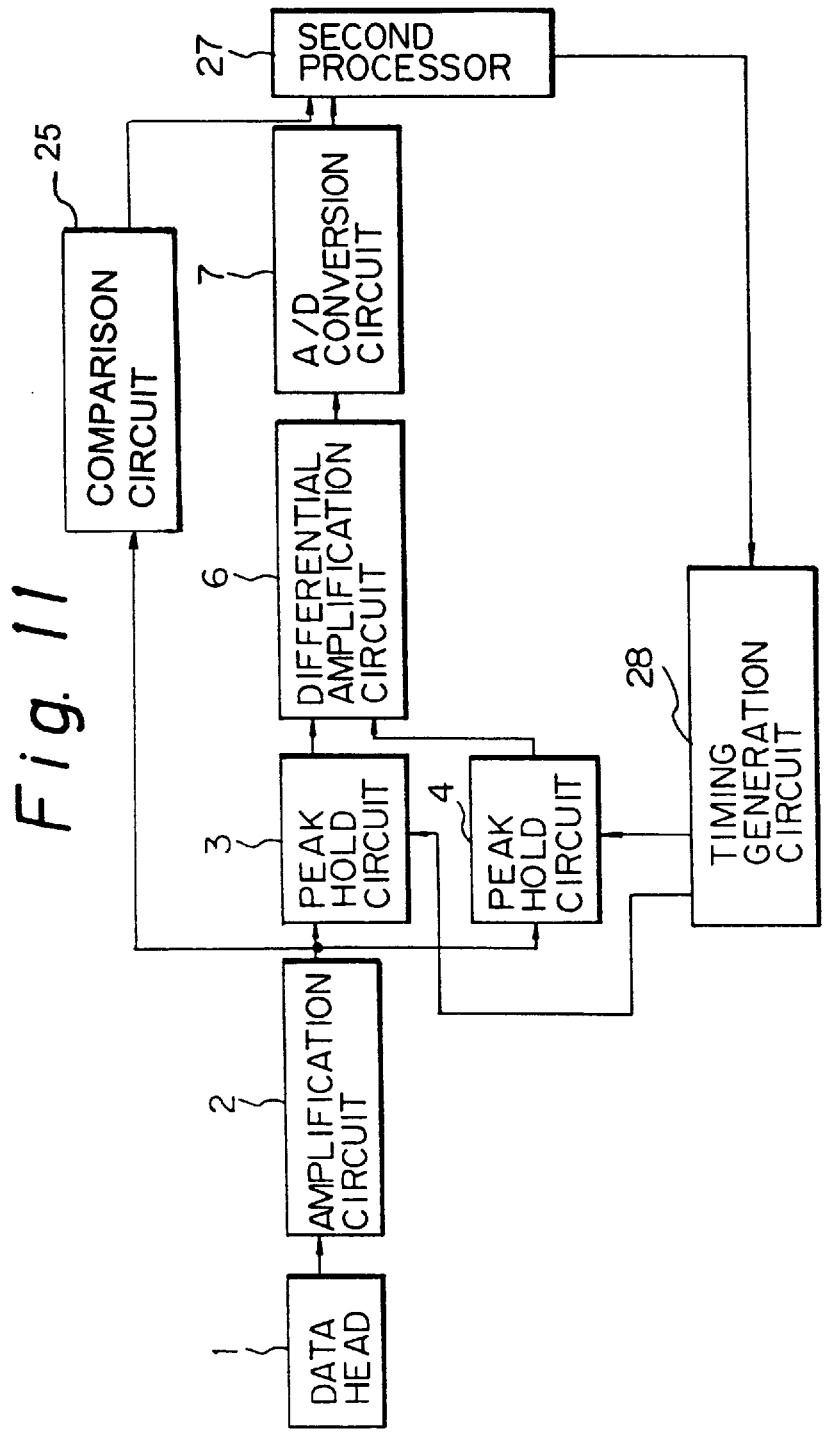
FIG. 11 is a block diagram for explaining a second preferred embodiment of the present invention.
Figure 12:
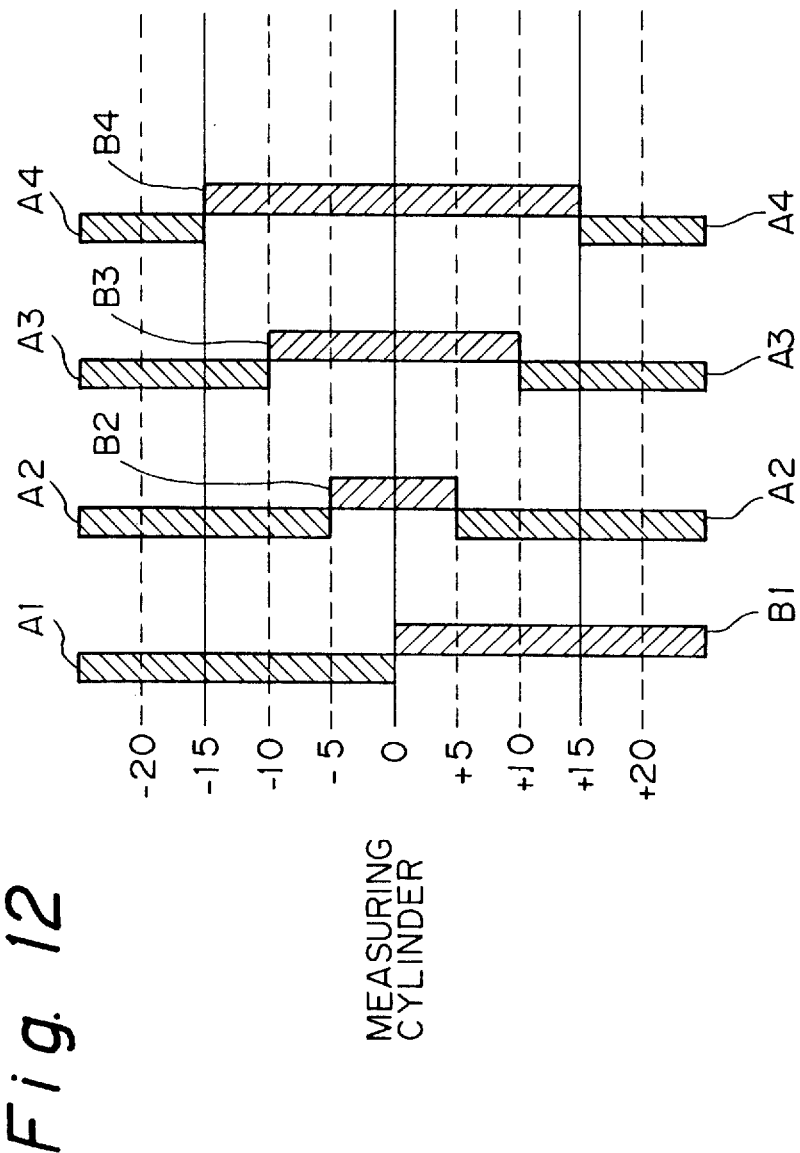
FIG. 12 is a diagram for explaining the operation of the circuit shown in FIG. 10.

Here, $V_a$, $V_b$, $V_c$, $V_d$, $V_e$, $V_f$ and $V_g$ denote peak values of the peak hold circuit 3 at the timings of A, B, C, D, E, F and G, respectively. Further, Y denotes a position error distance of head, which is indicated by the unit of track pitch. FIG. 11 is a block diagram of a circuit according to a second preferred embodiment of the present invention, and FIG. 12 is an explanatory view for explaining the operation of the circuit shown in FIG. 11.

In FIG. 11, like reference numerals are used to identify like constituents as in FIG. 1. FIG. 12 shows an example of the servo pattern of the present invention, wherein servo data A1 is recorded on the outer peripheral side while servo data B1 is recorded on the inner peripheral side, from the center of the measuring cylinder, respectively.

Servo data A2 is recorded from positions spaced apart by a distance of ±5 $\mu$m on the outer and inner peripheral sides from the center of the measuring cylinder with the core width of the data head being 10 $\mu$m, and servo data B2 is recorded at a length of 5 $\mu$m on the outer and inner peripheral sides from the center of the measuring cylinder, respectively, in such a manner as to continue the servo data A1 and B1 described above.

Servo data A3 is recorded from positions spaced apart by 10 $\mu$m on the outer and inner peripheral sides from the center of this measuring cylinder, and servo data B3 is recorded at a length of 10 $\mu$m on the outer and inner peripheral sides from the center of the measuring cylinder, in such a manner as to continue the servo data A2 and B2, respectively.

Servo data A4 is recorded from positions spaced apart by 15 $\mu$m on the outer and inner peripheral sides from the center of the measuring cylinder, and servo data B4 is recorded at a length of 15 $\mu$m on the outer and inner peripheral sides from the center of the measuring cylinder, in such a manner as to continue the servo data A3 and B3, respectively.

Assuming that a track gap is 15 $\mu$m, the centers of the adjacent tracks exist at positions that are spaced apart by distances of −15 $\mu$m and +15 $\mu$m from the measuring cylinder, respectively.

Under the control of the second processor 27, the timing generation circuit 28 first sends the timings for holding the peak values of the servo data A1 and B1 to the peak hold circuits 3 and 4, respectively. Therefore, the peak values of the servo data A1 and B1 read by the data head 1 are held by the peak hold circuits 3 and 4, respectively, in the same way as described above. The respective peak values VA1 and VB1 are sent to the differential amplification circuit 6 and the difference VA1−VB1 is determined.

When the A/D conversion circuit 7 converts the difference VA1−VB1 determined by the differential amplification circuit 6 to the digital value and sends it to the processor 27, the processor 27 calculates VA1−VB1. When the result proves to be |VA1−VB1|<1, the processor 27 judges that the position error distance of the data head 1 is less than 5 $\mu$m (Y<1).

If $|VA1-VB1|>1$, the processor 27 receives the next read result of the servo data A2 and B2, and calculates VA2-VB2. When the calculation result proves to be $|VA1-VB1|+|VA2-VB2|<2$, the processor 27 judges that the position error distance of the data head 1 is greater than 5 µm but less than 10 µm ($1 \leq Y<2$).

If $|VA1-VB1|+|VA2-VB2|>2$, the processor 27 receives the read result of the next servo data A3 and B3 and calculates VA3-VB3. If $|VA1-VB1|+|VA2-VB2|+|VA3-VB3|<3$, the processor 27 judges that the position error distance of the data head 1 is greater than 10 µm but less than 15 µm ($2 \leq Y<3$).

If $|VA1-VB1|+|VA2-VB2|+|VA3-VB3|>3$, the processor 27 receives the read result of the next servo data A4 and B4 and calculates VA4-VB4. If $|VA1-VB1|+|VA2-VB2|+|VA3-VB3|+|VA4-VB4|<4$, the processor 27 judges that the position error distance of the data head 1 is greater than 15 µm but less than 20 µm ($3 \leq Y<4$).

Figure 13:
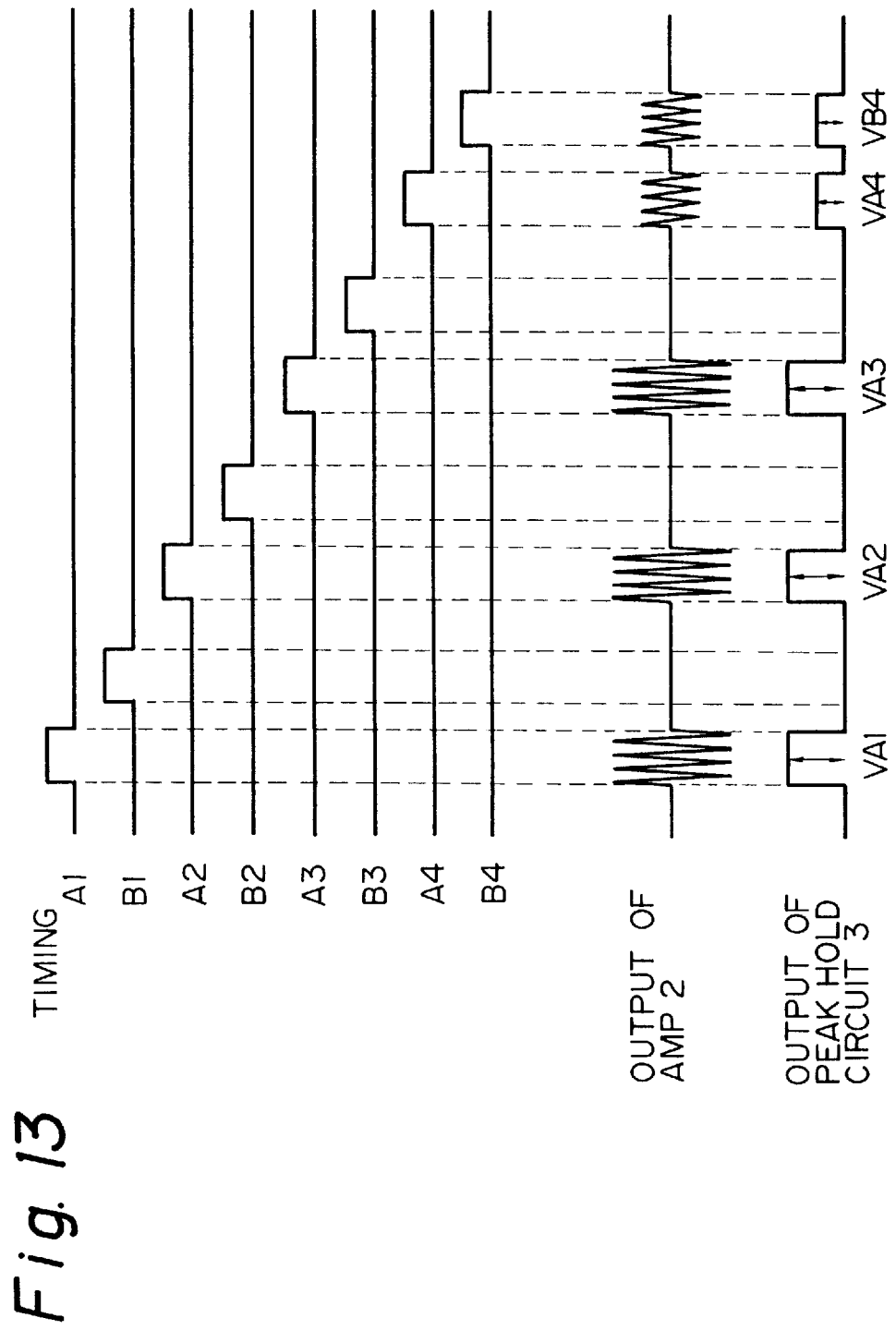
FIG. 13 is a diagram for explaining more definitely the diagram of FIG. 12.
Figure 14B:
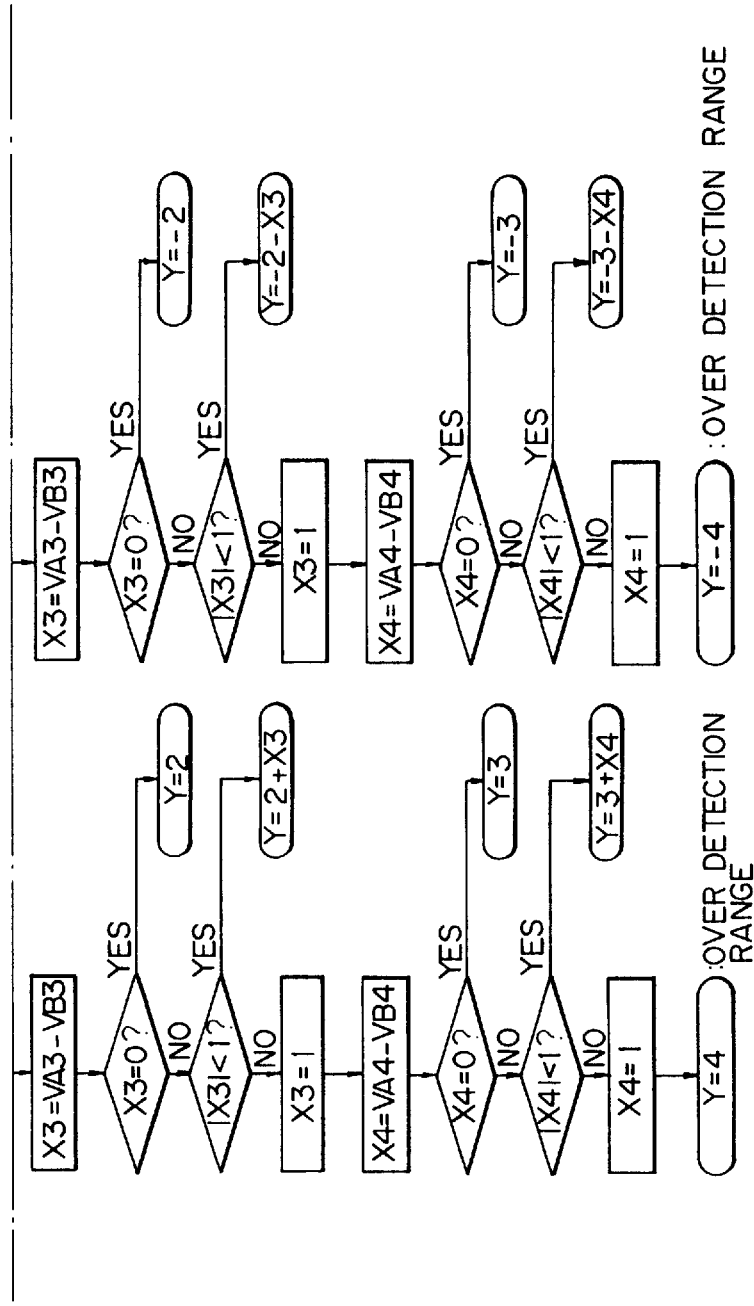

FIGS. 13 and 14 are a timing chart and a flowchart respectively, for definitely explaining FIG. 12.

Consider, for example, the case where the data head deviates by $-15$ µm from the center of the measuring cylinder in FIG. 12. It will be assumed hereby that the maximum output voltage of the peak hold circuit 3 is 1 and its minimum output voltage is 0. When VAi (i=1 to 4)=1, for example, VBi=0, and when Xi=VAi-VBi=1 and furthermore, when VBi=1, then, VAi=0 and Xi=VAi-VAi=-1, where VAi and VBi denote peak values at the respective timings. When VAi=VBi=0.5, Xi=VAi-VBi=0. As shown in FIGS. 13 and 14, the position error distance of the data head, i.e., $-15$ µm can finally be detected accurately by reading the patterns allocated on the outer and inner peripheral sides of the measuring cylinder and sequentially comparing these patterns with the pattern inside the comparison circuit 25.

FIG. 15 is a diagram for explaining the effect of FIG. 12.

The absolute value of the difference of the peak values of the servo data A and B is plotted on the abscissa, and the value µm representing the position error distance of the data head 1 is plotted on the ordinate. The detection range of the position error distance indicated by 4 in FIG. 2 according to the prior art is less than 5 µm, but in the embodiment shown in FIG. 12, the position error distance of four times, or less than 20 µm, can be detected.

Figure 16:
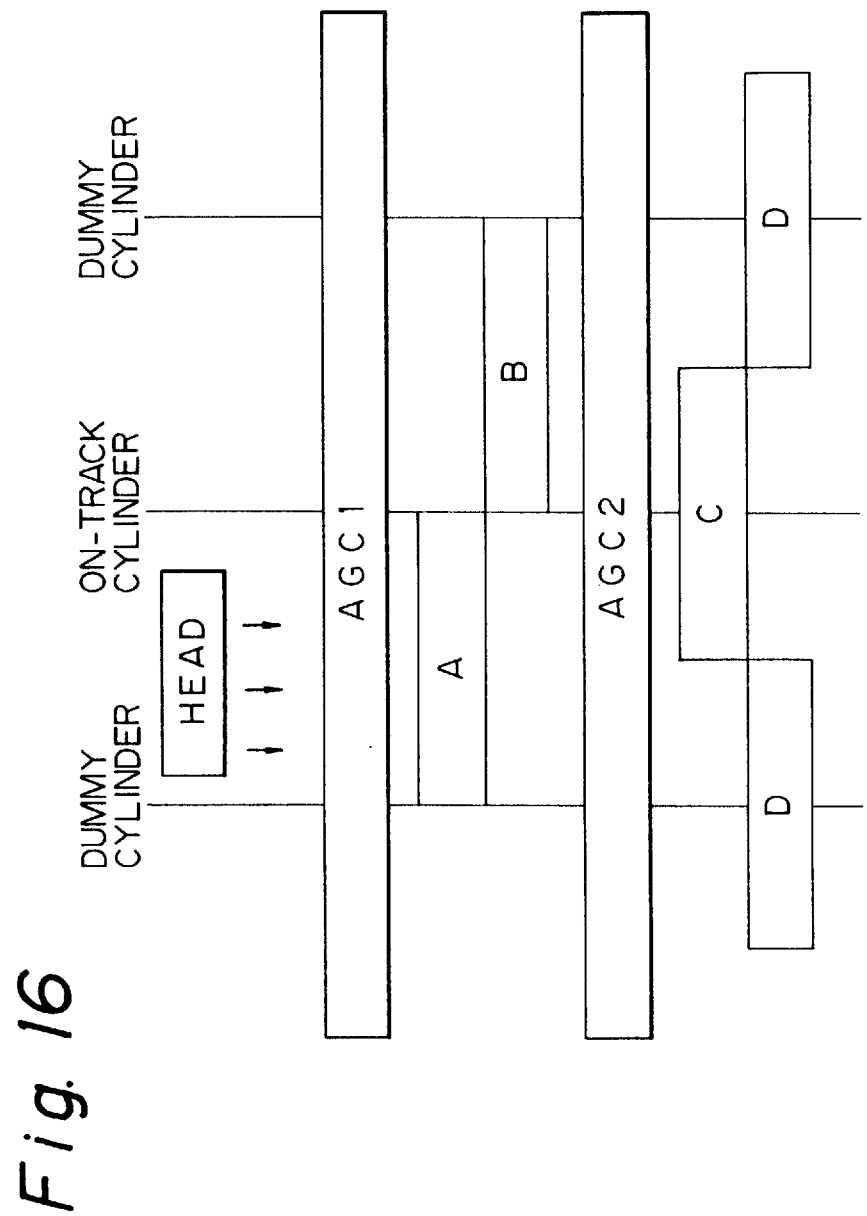
FIG. 16 is an explanatory view for explaining a third preferred embodiment of the present invention.

FIG. 16 is an explanatory view for explaining a third preferred embodiment of the present invention. In this embodiment, the detection range of the position error is expanded by changing the servo patterns for detecting the head position error from a single phase to two phases.

Figure 17:
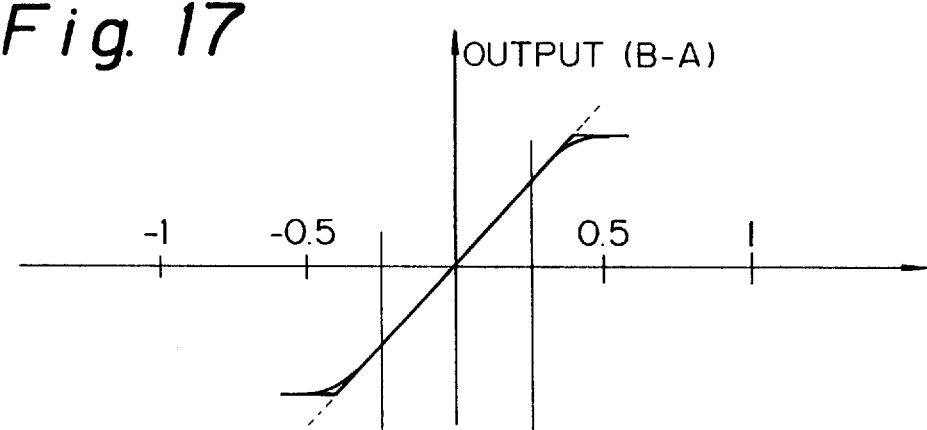
FIG. 17 is a diagram showing a first position data read out from a servo pattern shown in FIG. 16.
Figure 18:
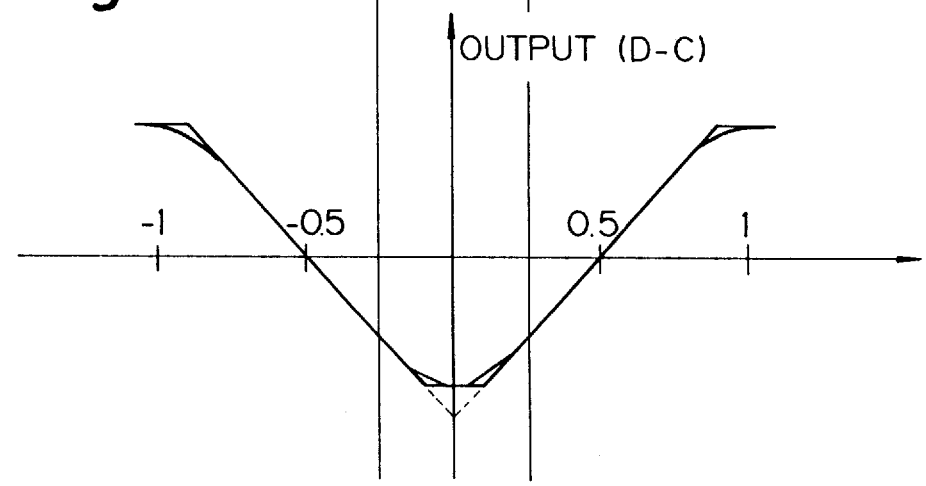
FIG. 18 is a diagram showing a second position data read out from a servo pattern shown in FIG. 16.
Figure 19:
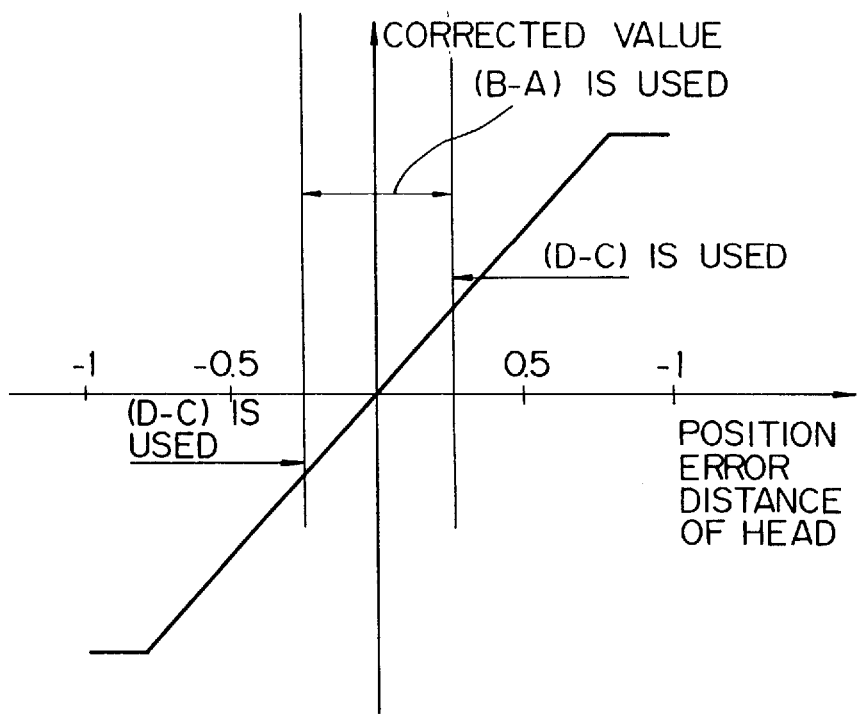
FIG. 19 is a diagram showing the result of synthesis of the position data shown in FIGS. 17 and 18.

An explanation will be given in more detail. According to the prior art, only single-phase servo patterns A, B have been allocated on the outer and inner peripheral sides of the measuring cylinder. Therefore, the maximum correctable range in which linearity at the time of detection is guaranteed is limited to about 60% of the track gap as shown also in FIG. 17. In contrast, in the third preferred embodiment of the present invention, more one phase servo patterns C, D are added, and this second phase servo pattern provides the relation such as shown in FIG. 18. When the two-phase servo patterns are detected, the relation shown in FIG. 19, which is the result of synthesis of FIGS. 17 and 18, can be obtained, and the range in which linearity at the time of detection of the position error distance occurs can be expanded much more than in the prior art. Accordingly, the position error distance can be detected accurately even when the deviation between the heads, etc., becomes relatively large.

Figure 20:
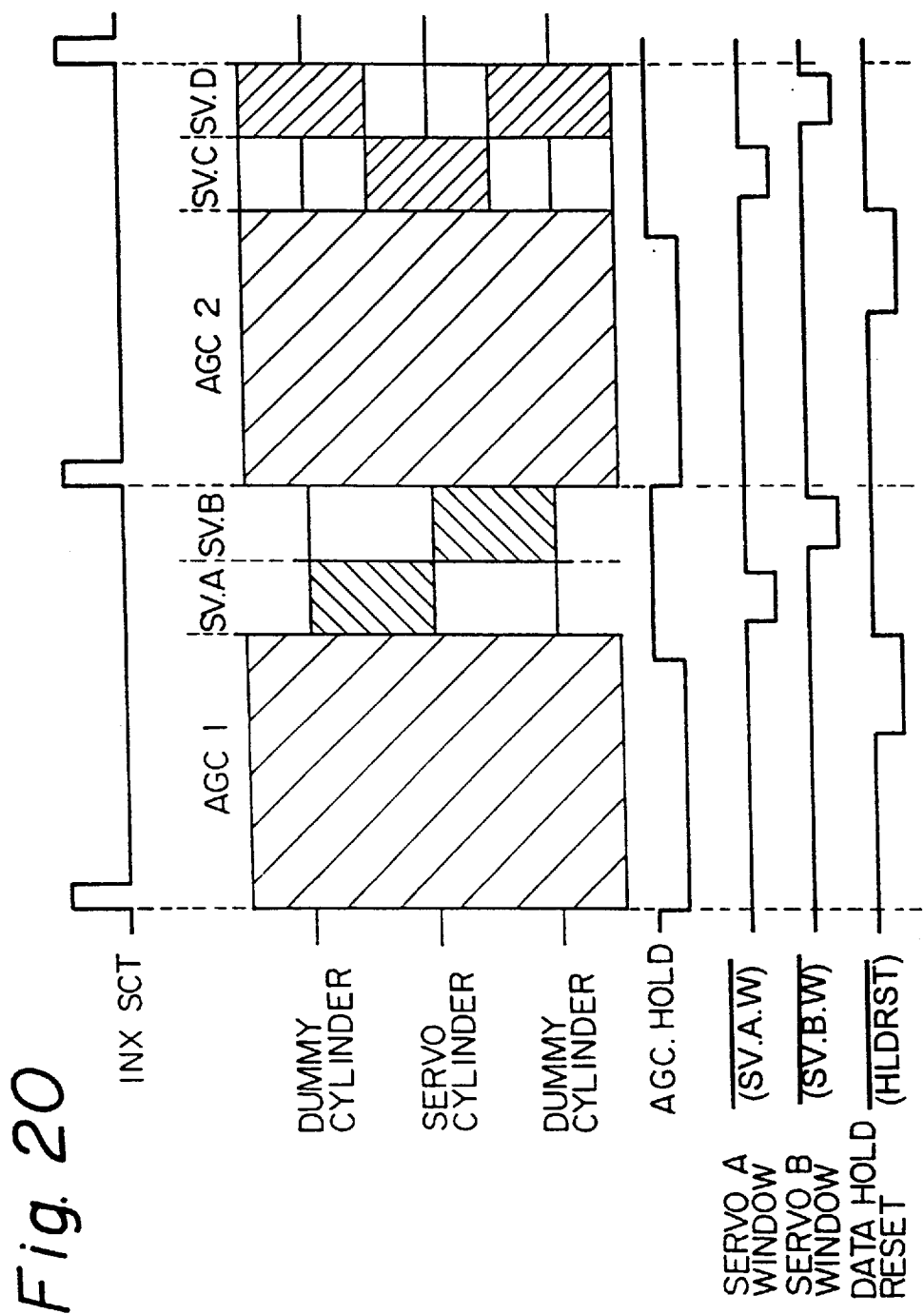
FIG. 20 is a timing chart useful for explaining the write operation and read operation and read operation in FIG. 16.

In this case, in order to prevent the circuit from becoming much more complicated due to the construction of the two-phase servo patterns, a system is employed in which the servo patterns are written at timings shown in FIG. 20 and each phase of the two phases is read out alternately. In this read processing, the servo patterns are read by a hardware circuit equivalent to the hardware circuit for reading the single phase servo patterns. Furthermore, this system employs a circuit construction in which the results B−A and D−C of these read processings are directly input into the A/D conversion circuit. Moreover, in order to prevent any adverse influence of the processings (including the write operation) other than the servo pattern read processing on the ordinary data readout processing, the processing described above is preferably carried out at the timing (roughly hatched portion) of automatic gain control (AGC).

Further, in this case, just before AGC operation is completed, all the data are reset ($\overline{\text{HLDRST}}$) and then the above AGC condition is held (AGC. HOLD). In such condition, each window of servo A and B ($\overline{\text{SV.A.W}}$ and $\overline{\text{SV.B.W}}$) becomes open sequentially and each pattern is readout accurately (finely hatched portion).

Furthermore, in FIG. 20, the signals of positive logic are utilized in respect to AGC.HOLD. On the contrary, the signals of negative logic are utilized in respect to Data Hold Reset, Servo A Window and Servo B Window. Accordingly, to distinguish between the above positive and negative logic signals clearly, bars (—) are added to the respective upper portion of "HLDRST", "SV.A.W" and SV.B.W" relating to the negative signals.

Definite write procedures are illustrated in the following Table 1 and in FIGS. 21A to 21J.

The write procedures are illustrated below with the servo surface measuring cylinder being a 0 cylinder. Here, it is assumed that the track pitch is 11.5 µm and the core width of the head is about 8 µm.

TABLE 1

| Sequence | Cylinder | Offset (µm) | Write Signal |
|---|---|---|---|
| 1 | 0 | −4/48 | AGC + A |
| 2 | −1 | +4.48 | AGC + A |
| 3 | 0 | +4.48 | AGC + B |
| 4 | 1 | −4.48 | AGC + B |
| 5 | 0 | −1.23 | AGC + C |
| 6 | 0 | +1.23 | AGC + C |
| 7 | 1 | +1.23 | AGC + D |
| 8 | 1 | −1.23 | AGC + D |
| 9 | −1 | −1.23 | AGC + D |
| 10 | −1 | +1.23 | AGC + D |

As tabulated in Table 1 above, the influences of the offset of overwrite are less apt to occur when AGC signal is written alternately in respect to two dummy cylinders 1, −1.

FIGS. 21A to 21J are diagrams showing write sequences of servo patterns which are written in accordance with the timing shown in FIG. 20.

In FIGS. 21A to 21J, the patterns for detecting the position error are written in respect to the hatched portion by utilizing the data surface servo while the positions of the data head are sequentially moved, in accordance with the sequences 1 to 8 of Table 1.

Figure 21A:
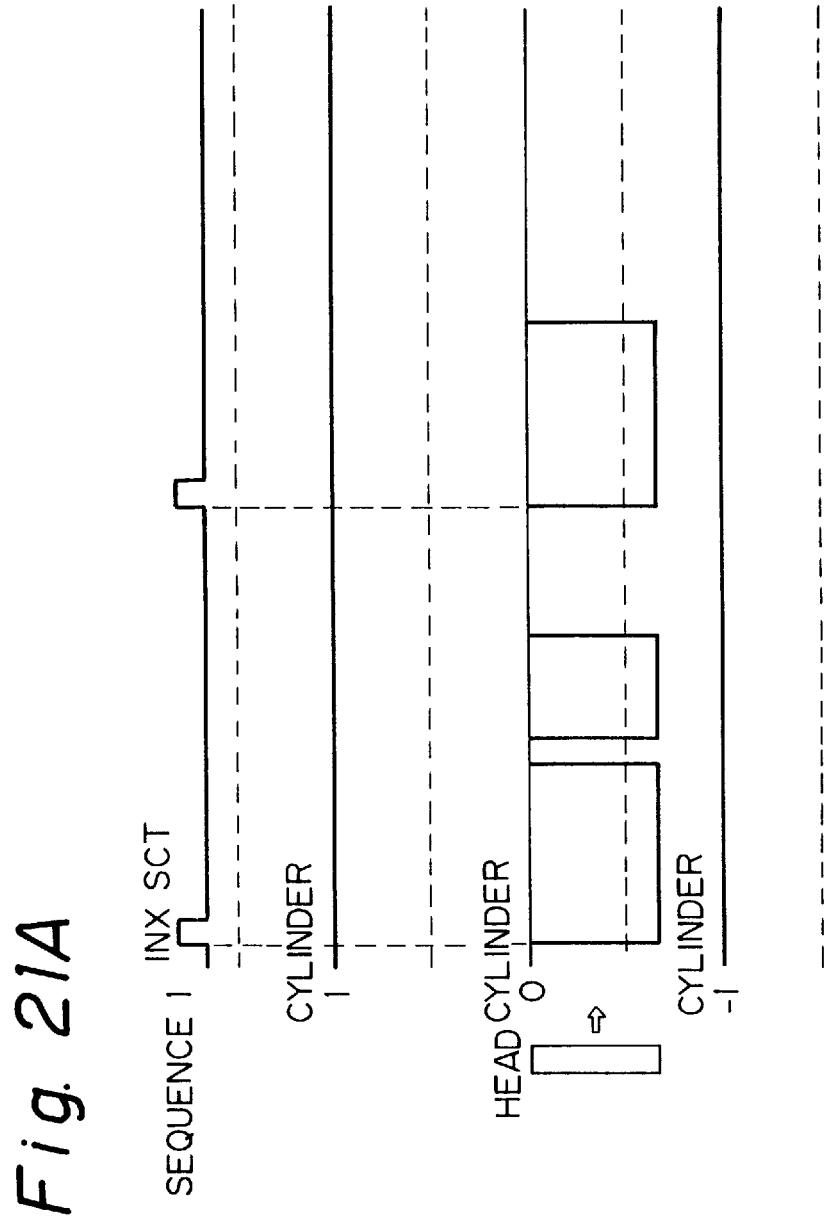
Figure 21B:
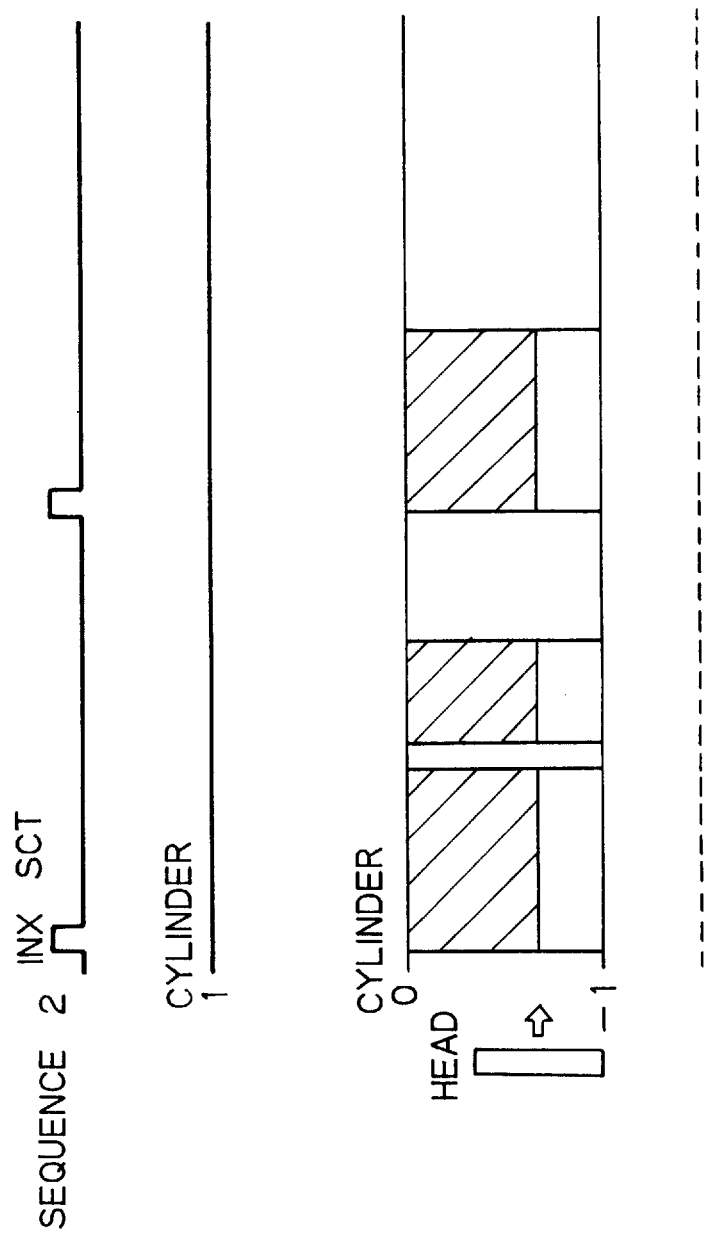
Figure 21C:
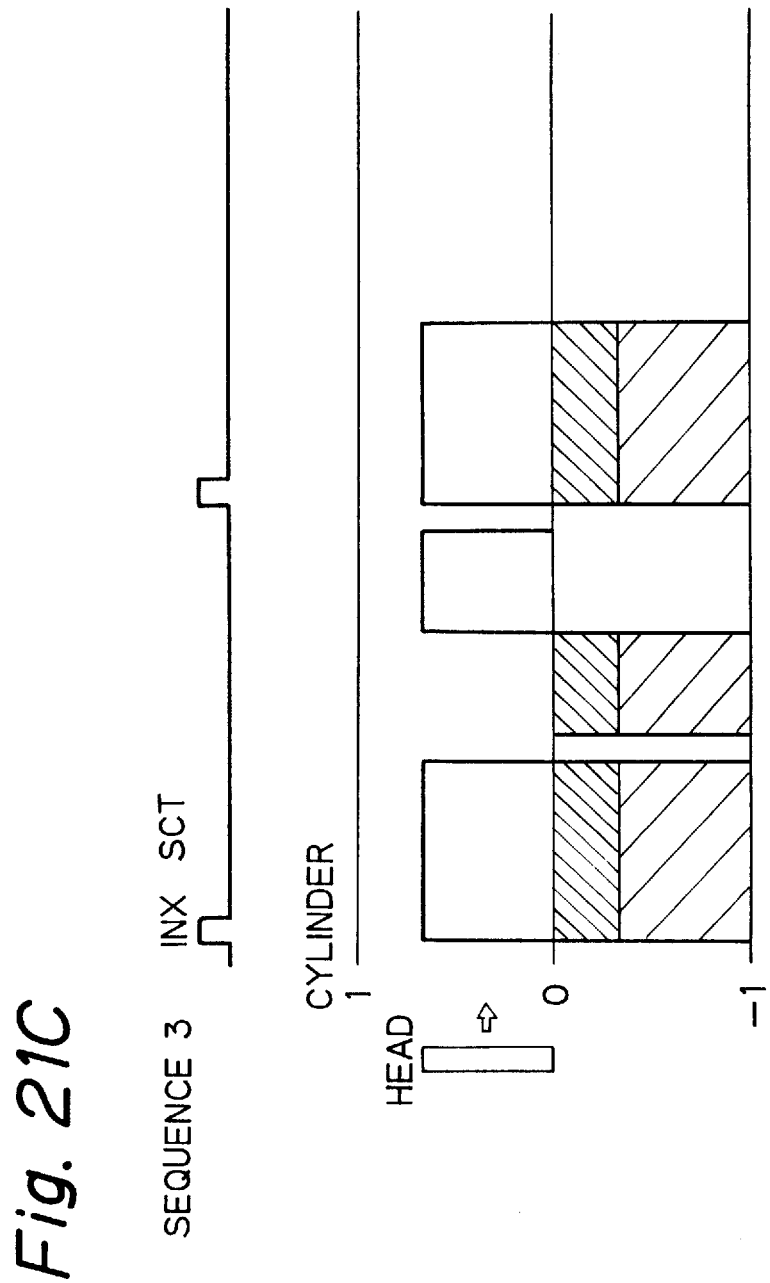
Figure 21E:
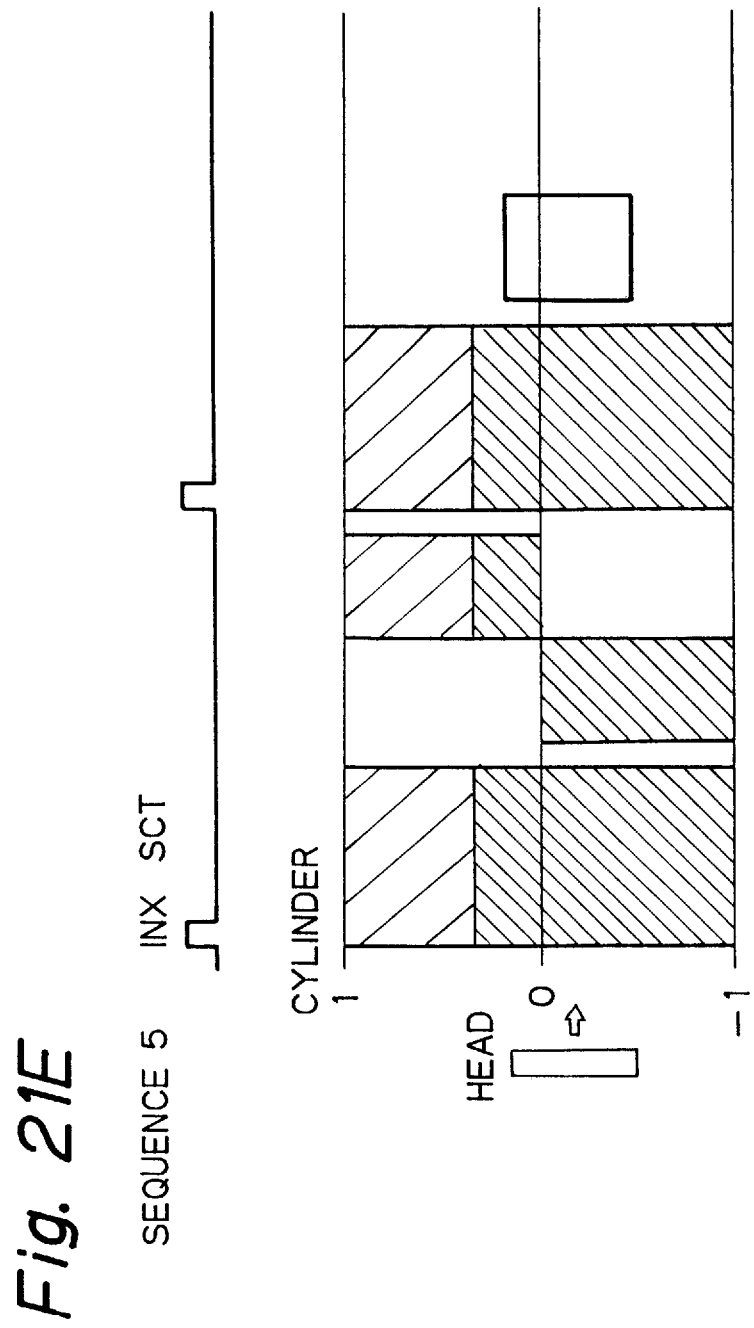
Figure 21F:
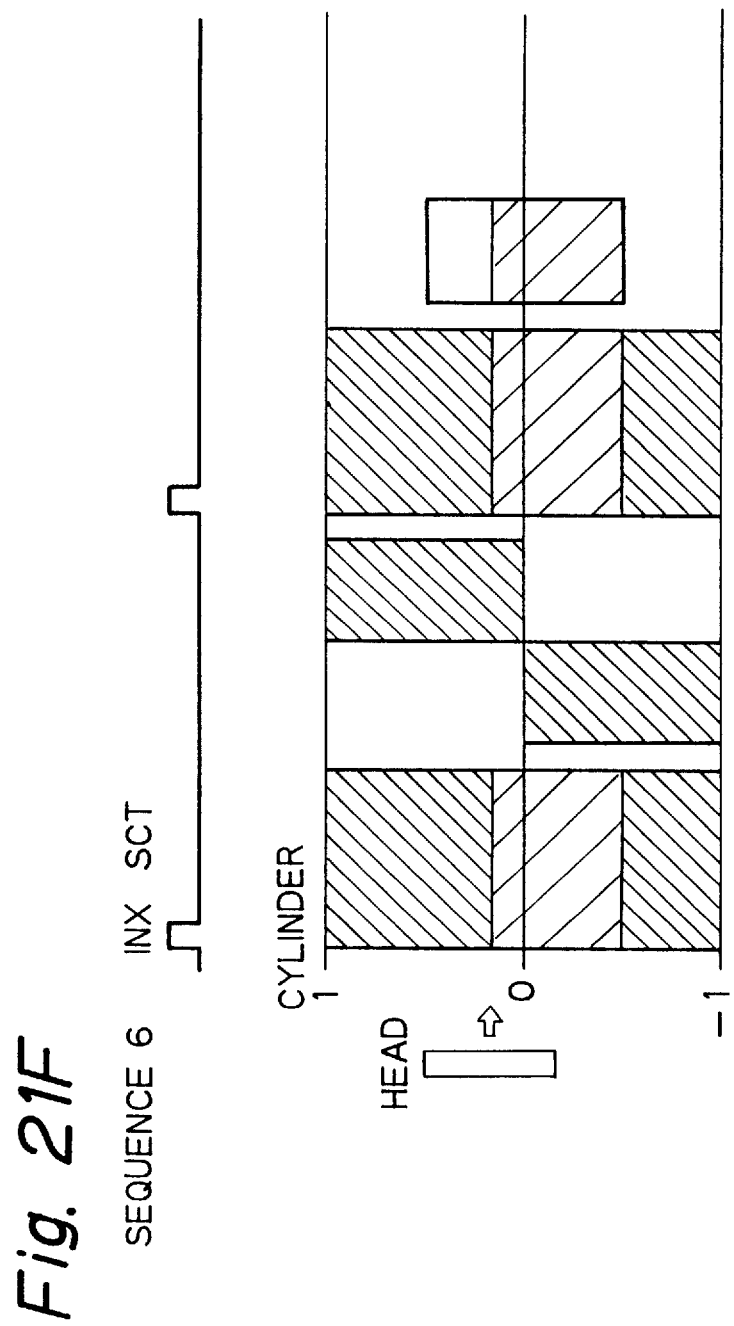
Figure 21H:
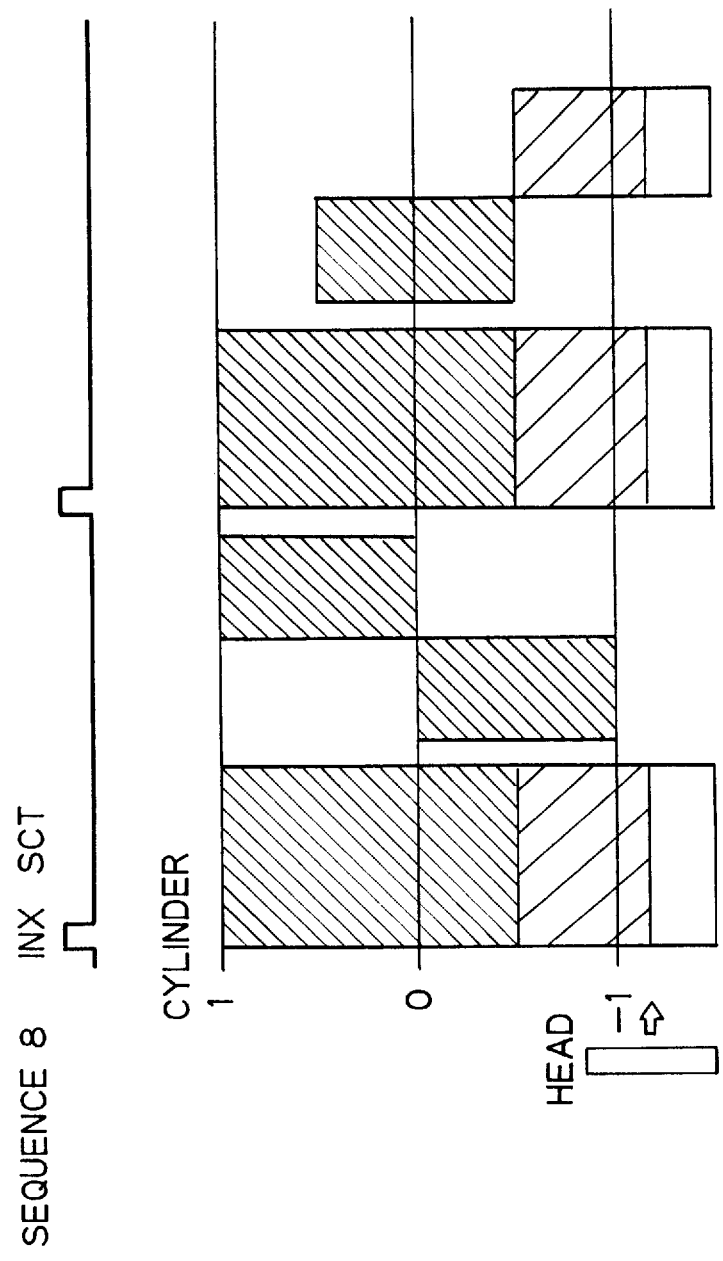
Figure 21I:
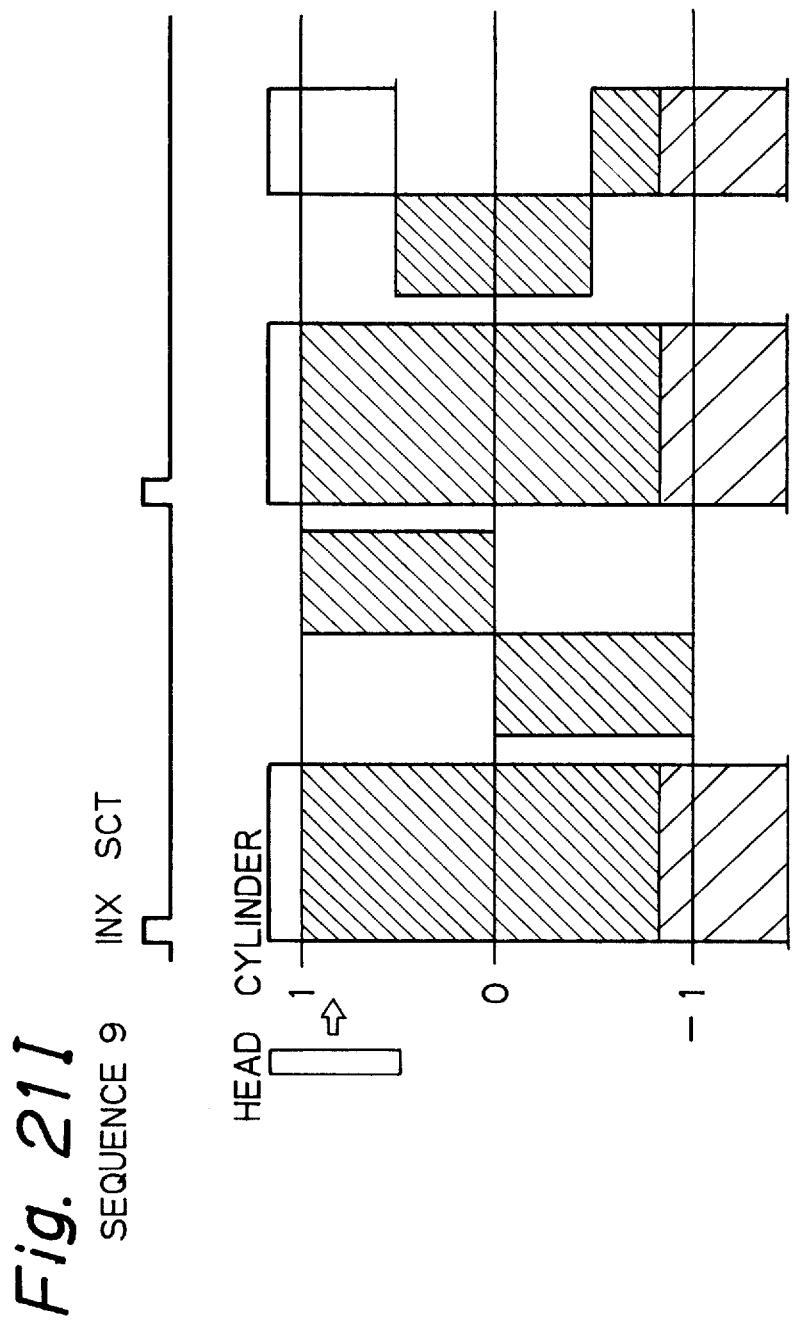

To be more specific, servo patterns are sequentially written from FIG. 21A to FIG. 21B, respectively corresponding to the write sequences 1 to 10 shown in Table 1, by periodically moving the head between measuring cylinder 0 and dummy cylinders 1, −1. In each of these figures, roughly hatched portion represents the region where write operation has just performed, while finely hatched portion represents the region where the patterns were already written in previous sequences.

Figure 21J:
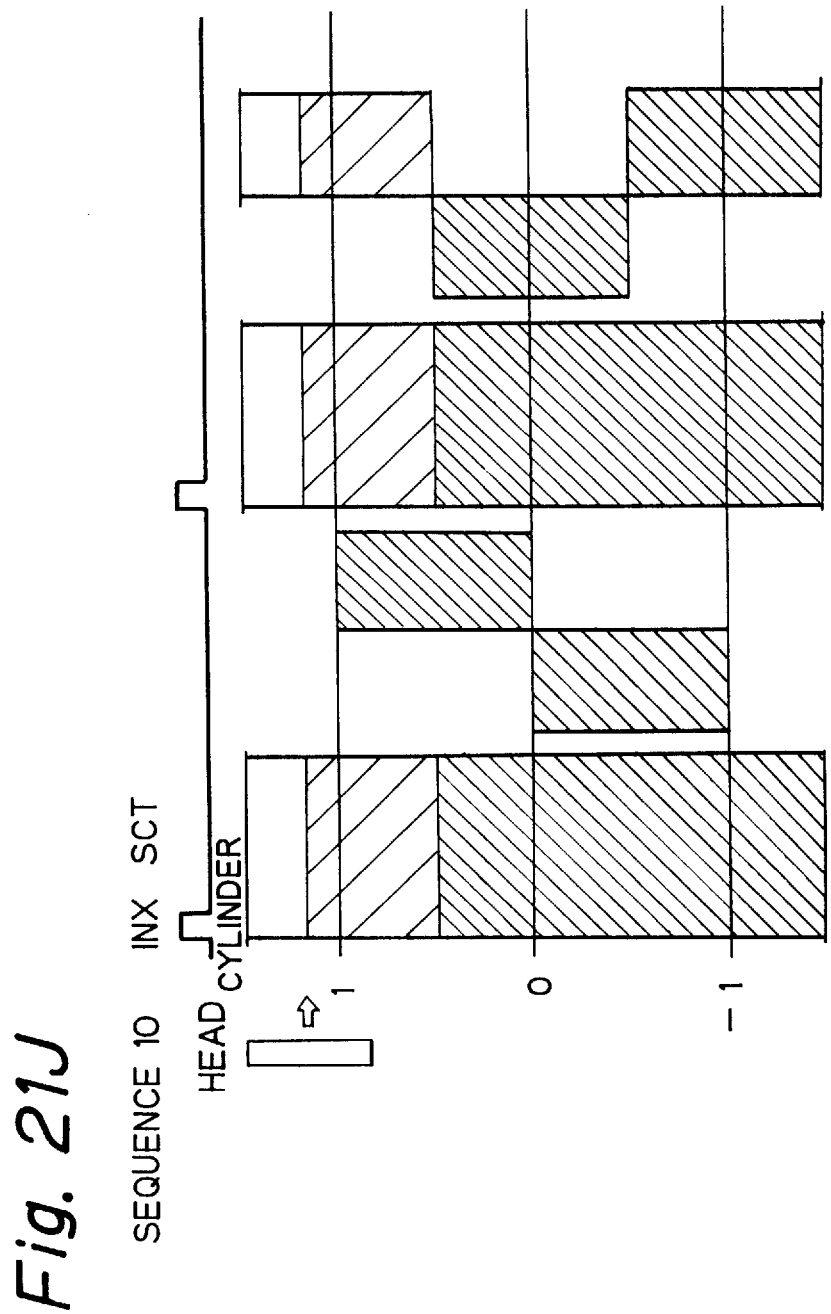

Just before the write sequence 1 shown in FIG. 21A is executed, any servo pattern is not written yet. First, when the write sequence 1 is executed, the servo patterns corresponding to the position of head have been written as illustrated in FIG. 21B. Next, when the write sequence 2 is executed, the servo patterns corresponding to the next position of head have been written as illustrated in sequence 3. In this case, the patterns written in the sequence 2 overlaps partially with the patterns written in the sequence 1. Further, by moving the head alternately in respect to the measuring cylinder 0, servo patterns are sequentially written in approximately equal proportion in respect to two dummy cylinders, as illustrated in FIG. 21C–21J. In FIG. 21J, servo patterns can be finally written in all the detection region.

Figure 22:
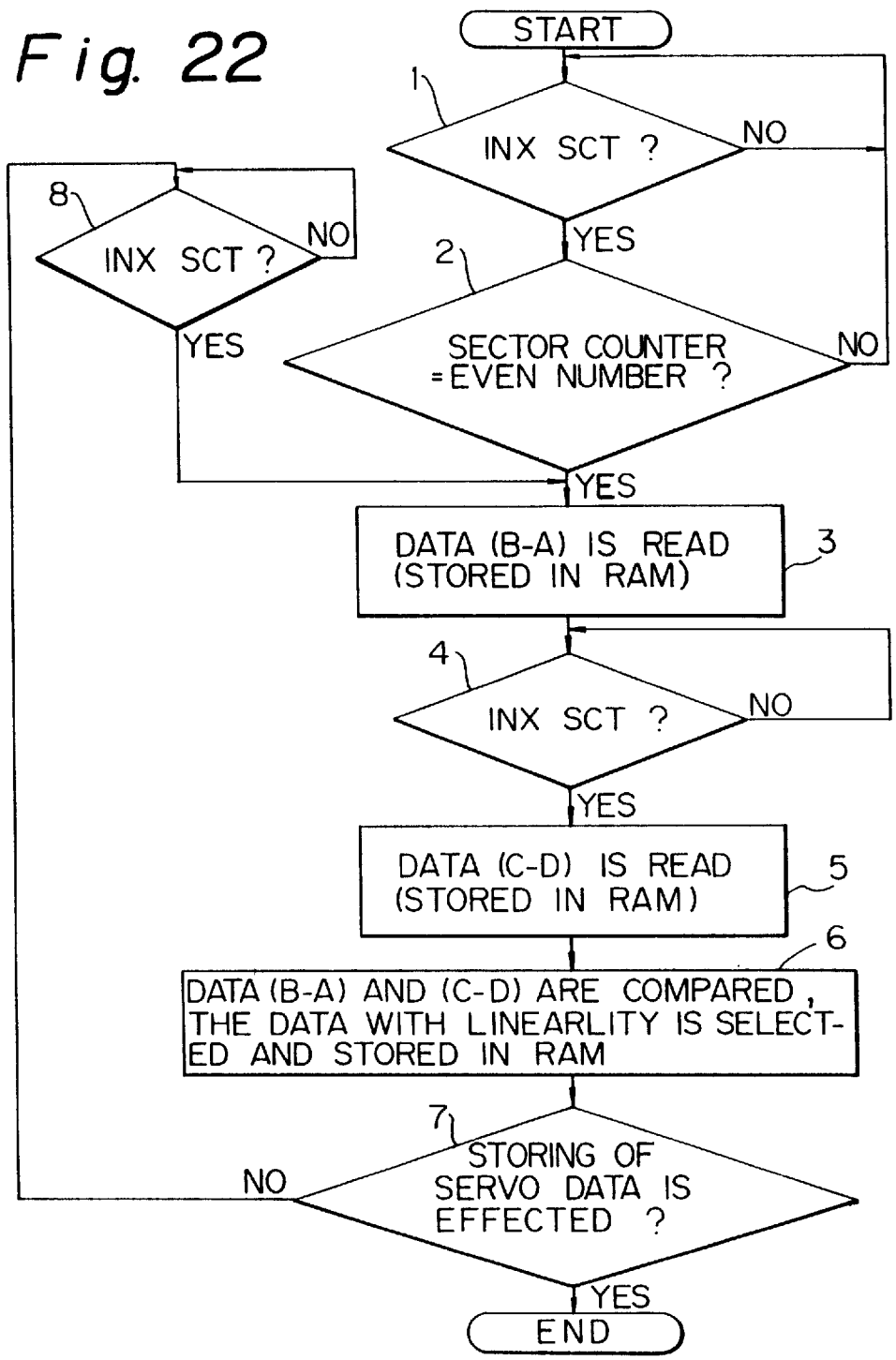
FIG. 22 is a flowchart for explaining a series of operations shown in FIG. 20.

FIGS. 22 and 23 are a flowchart and a read wave form diagram showing definitely the operation of the third preferred embodiment of the present invention.

To effect the position error detection of the data head by utilizing the two-phase servo patterns in FIG. 22, a timing is first obtained by an index sector (INX SCT) as the reference block signal of the magnetic disk apparatus, and data B–A and D–C are read in accordance with this timing (Step 1). In this case, the data that is to be first read is fixed beforehand to B–A or D–C. (Here, the data is set to B–A). The data read operation is prepared at the time when the sector counter reaches an even number (Step 2).

Then, the first phase data B–A is read and stored in the RAM 12. However, this operation must be completed during the time when the AGC condition is held and before the hold reset of the data is effected (Step 3). Next, the timing is established in the same way as in Step 1, in Step 4. The second phase data D–C is then read and stored in the RAM (Step 5). Furthermore, two kinds of data B–A and C–D stored in the RAM are compared with each other, and the data having higher linearity is selected and is stored in the RAM as the true position error data (Step 6).

In other words, the data B–A, that is, the servo B–A is read at the timing shown in FIG. 23 and is stored in the RAM of the MPU at the timing of AGC2. Next, the data D–C, that is, the servo D–C, is stored in the RAM of the MPU by judging which of the two servos is used and calculating the correction value, in the timing of AGC1.

The operation described above is effected for one round of track x for each head, and the stored data is read out from the RAM at the time of positioning to a target track and the correction is made (Step 7, Step 8).

When the data head is on-track in FIG. 23, that is, when no position error of the data head exists (head position (1)), the detection voltage $V_D$ of the timing D becomes minimal and the detection voltages $V_A$ and $V_B$ become equal, and this voltage $V_D$ becomes greater and the detection voltage $V_C$ becomes smaller with an increasing degree of off-track distance (head position (2)→(1), (4)→(5)).

As described above, the present invention can improve eccentricity of the rotary disk (medium) and the maximum correction quantity of the error between the heads by the use of a plurality of kinds of patterns as the data surface servo, and can accomplish accurate and high speed positioning in the high capacity magnetic disk.

We claim:

1. An apparatus for detecting a position error distance of a data head in a disk apparatus with respect to the center of a measuring cylinder by reading servo burst patterns recorded on a data surface of a disk, on either side of a center of the measuring cylinder, the measuring cylinder being a dedicated servo data cylinder which does not store user data, said apparatus comprising:

means for reading a plurality of kinds of said servo burst patterns from a plurality of contiguous servo data cylinders storing a plurality of kinds of contiguous servo data, and which are located on both outer and inner peripheral sides of the center of the measuring cylinder, wherein said outer and inner peripheral sides are defined with respect to a radial direction of concentric circles formed by all the cylinders;

means for detecting a rough position error distance of the data head from the measuring cylinder on the basis of the combination of parts of a plurality of kinds of said servo burst patterns;

means for detecting a detailed position error distance of the data head on the basis of the combination of other parts of a plurality of kinds of said servo burst patterns; and means for determining an accurate position error distance by comparing and totaling said rough position error distance and said detailed position error distance.

2. An apparatus for detecting head position error according to claim 1, said servo burst patterns comprising:

first servo burst patterns having a first portion on the outer peripheral side of the center of the measuring cylinder and a second portion contiguous with said first portion of first servo burst patterns and substantially spaced-apart from the center of the measuring cylinder by ½ of the core width of the data head; and second servo burst patterns having a first portion on the inner peripheral side of the center of the measuring cylinder and a second portion contiguous with said first portion of second servo burst patterns and substantially spaced apart from the center of the measuring cylinder by ½ of the core width of the data head.

3. An apparatus for detecting head position error according to claim 2, said servo burst patterns wherein:

said first servo burst patterns have a third portion contiguous with said second portion of said first servo burst patterns and being substantially spaced apart from the center of the measuring cylinder by the core width of the data head, and a fourth portion of said first servo burst patterns contiguous with said third portion and being spaced apart from the center of the measuring cylinder by 1.5 times the core width of the data head; and said second servo burst patterns have a third portion contiguous with said second portion and a substantially spaced apart from the center of the measuring cylinder by the core width of the data head, and a fourth portion of said second servo burst patterns contiguous with said third portion and a spaced apart from the center of the measuring cylinder by 1.5 times the core width of the data head.

4. A method of detecting a position error of a head in a disk apparatus for detecting a position error distance of a data head with respect to a center of a measuring cylinder by reading servo burst patterns contiguously recorded on a data surface of a disk on servo data cylinders storing servo data and which are located on either side of the measuring cylinder, the measuring cylinder being a dedicated servo data cylinder which does not store user data, said method comprising:

a step of reading a plurality of kinds of contiguous servo burst patterns written in at least three contiguous servo data cylinders on both outer and inner peripheral sides of the measuring cylinder, wherein said outer and inner peripheral sides are defined with respect to a radial direction of concentric circles formed by all the cylinders;

a step of detecting a rough position error distance of the data head from the center of the measuring cylinder on the basis of combination of parts of a plurality of kinds of said servo burst patterns;

a step of detecting a detailed position error distance of the data head on the basis of the combination of other parts of a plurality of kinds of said patterns; and a step of determining an accurate position error distance by comparing and totaling said rough position error distance and said detailed position error distance.

5. A position error detection method according to claim 4, further including a step of recording said servo burst patterns, said servo burst patterns comprising:

first servo burst patterns having a first portion on the outer peripheral side of the measuring cylinder and a second portion contiguous with said first portion and substantially spaced apart from the center of the measuring cylinder by ½ of the core width of the data head; and second servo burst patterns having a first portion on the inner peripheral side of the measuring cylinder and a second portion positioned contiguous with said first portion and substantially spaced apart from the center of the measuring cylinder by ½ of the core width of the data head.

6. An apparatus for detecting a position error of a head in a disk drive, and for detecting a position error distance of a data head between a real position and the center of a measuring cylinder using a plurality of servo data patterns recorded on a data surface of a disk on servo data cylinders storing servo data and located on either side of the measuring cylinder the measuring cylinder being a dedicated servo data cylinder on a data surface of a disk, storing only servo data, and is divided into a plurality of portions storing a plurality of kinds of contiguous servo data, said apparatus comprising:

at least three contiguous servo data cylinders which are located on at least one of said outer and inner peripheral sides of the measuring cylinder, wherein said outer and inner peripheral sides are defined with respect to a radial direction of concentric circles formed by all the cylinders, each of said servo data cylinders having a predetermined width and having a predetermined servo data pattern recorded along the center of said servo data cylinder, with different offset from the center of the measuring cylinder, total servo data patterns in all the servo data cylinders including a first portion of servo burst patterns for detecting a rough position error, and a second portion of servo burst patterns for detecting a detailed position error;

means for reproducing, from the data surface, said first and second portions of said servo burst patterns;

means for detecting said rough position error of the data head, based on a first read-out signal reproduced from said first portion of servo burst patterns; and means for detecting an accurate position error distance of the data head, based on said rough position error and said detailed position error.

7. The apparatus of claim 6 comprising:

means for allocating a plurality of regions contiguous with the outer and inner peripheral sides of the measuring cylinder with a core width of the data head being an allocation unit, the data surface having combinations of a plurality of first servo burst patterns on the outer peripheral side of the measuring cylinder, and a plurality of second servo burst patterns on the inner peripheral side of measuring cylinder for dividedly detecting a plurality of said regions, and detecting a position error distance of the data head; and means for detecting the position error distance from the combination of said plurality of kinds of said servo burst patterns read by the data head as the position error distance of the data head with respect to the center of the measuring cylinder.

8. A method for detecting a position error of a head in a disk drive, for detecting a position error distance of a data head between a real position and the center of a measuring cylinder using a plurality of servo burst patterns recorded on a data surface of a disk on at least three contiguous servo data cylinders contiguously storing servo data and which are located on at least one of an outer and an inner peripheral side of the measuring cylinder, wherein said outer and inner peripheral sides are defined with respect to a radial direction of concentric circles formed by all the cylinders, the measuring cylinder being a dedicated servo data cylinder storing only servo data and is divided into a plurality of regions storing a plurality of kinds of contiguous servo data each of said servo data cylinders having a predetermined width and having a predetermined servo pattern recorded along the center of said servo data cylinder, and having a different offset from the center of the measuring cylinder, total servo burst patterns in all the servo data cylinders including first and second portions of a first servo burst patterns for detecting a rough position error, and first and second portions of a second servo burst patterns for detecting a detailed position error, comprising the steps of:

reproducing, from the data surface, said first portion of said first servo burst patterns and said second portion of said first servo burst patterns;

detecting said rough position error of the data head, based on a first read-out signal reproduced from said first and second portions of said first servo burst patterns; and detecting an accurate position error distance of the data head, based on said rough position error and said detailed position error.

9. The method of claim 8, which further includes:

allocating on the data surface a plurality of contiguous regions on the outer and inner peripheral sides of the measuring cylinder, and measured from the center of the measuring cylinder by center allocation with a core width of the data head being a unit, said plurality of regions having a plurality of first and second patterns for detecting a position error distance of the data head; and detecting the position error distance of the data head with respect to the measuring cylinder from the combination of a plurality of kinds of said first and second patterns.

10. The method of claim 8 further comprising the steps of:

reading said plurality of kinds of servo patterns from at least three contiguous regions on the outer and inner peripheral sides of the measuring cylinder;

detecting a rough position error distance of the data head from the measuring cylinder on the basis of the combination of part of said plurality of kinds of servo burst patterns;

detecting a detailed position error distance of the data head on the basis of the combination of other parts of said plurality of kinds of servo burst patterns; and determining an accurate position error distance by comparing and totaling said rough position error distance and said detailed position error distance; wherein said plurality of kinds of servo burst patterns read includes:

first servo burst patterns having first and second portions, said first and second portions being positioned substantially spaced apart from the center of the measuring cylinder by ½ of the core width of the data head on the outer and inner peripheral sides of the measuring cylinder, respectively; and second servo burst patterns having first and second portions, said first and second portions being contiguous with said first and second portions of said first servo burst patterns, respectively, and being spaced apart from the center of the measuring cylinder by substantially ½ of the core width of the data head.

* * * * *

UNITED STATES PATENT AND TRADEMARK OFFICE
CERTIFICATE OF CORRECTION

PATENT NO. : 5,815,338
DATED : September 29, 1998
INVENTOR(S) : Tsunekawa et al.

Page 1 of 2

It is certified that error appears in the above-identified patent and that said Letters Patent is hereby corrected as shown below:

Column 6, line 44, delete "15" and insert --25-- therefor

Column 7, line 18, delete "in FIG. 4 at 4-5" and insert --at 4 at 4 at 5 in FIG. 4-- therefor Column 7, line 20, delete "in FIG. 4 at 4-6" and insert --at 4 at 6 in FIG. 4-- therefor Column 9, line 13, delete ">3" and insert --$\geq 3$-- therefor

UNITED STATES PATENT AND TRADEMARK OFFICE
CERTIFICATE OF CORRECTION

PATENT NO. : 5,815,338
DATED : September 29, 1998
INVENTOR(S) : Tsunekawa et al.

It is certified that error appears in the above-identified patent and that said Letters Patent is hereby corrected as shown below:

Column 11, line 12, delete "overlaps" and insert --overlap-- therefor

Column 12, line 52, delete "a substantially" and insert --are substantially-- therefor Column 12, line 56, delete "a spaced" and insert --are spaced-- therefor Signed and Sealed this Fifteenth Day of August, 2000

Attest:

Q. TODD DICKINSON

Attesting Officer

Director of Patents and Trademarks